United States Patent
Newman et al.

(10) Patent No.: US 10,996,453 B2
(45) Date of Patent: May 4, 2021

(54) PATTERN ANGLE SPATIAL SELECTION STRUCTURED ILLUMINATION IMAGING

(71) Applicant: ILLUMINA, INC., San Diego, CA (US)

(72) Inventors: Peter Clarke Newman, San Diego, CA (US); Danilo Condello, San Francisco, CA (US); Shaoping Lu, Palo Alto, CA (US); Simon Prince, Carlsbad, CA (US); Merek C. Siu, Alameda, CA (US); Stanley S. Hong, Palo Alto, CA (US); Aaron Liu, Riverside, CA (US)

(73) Assignee: ILLUMINA, INC., San Diego, CA (US)

( * ) Notice: Subject to any disclaimer, the term of this patent is extended or adjusted under 35 U.S.C. 154(b) by 0 days.

(21) Appl. No.: 16/626,113

(22) PCT Filed: Jan. 14, 2019

(86) PCT No.: PCT/US2019/013504
§ 371 (c)(1),
(2) Date: Dec. 23, 2019

(87) PCT Pub. No.: WO2019/143564
PCT Pub. Date: Jul. 25, 2019

(65) Prior Publication Data
US 2020/0218050 A1    Jul. 9, 2020

Related U.S. Application Data

(60) Provisional application No. 62/618,059, filed on Jan. 16, 2018.

(30) Foreign Application Priority Data

Mar. 20, 2018    (NL) .................................. 2020620

(51) Int. Cl.
*G02B 21/06* (2006.01)
*G01N 21/64* (2006.01)
*G02B 21/18* (2006.01)

(52) U.S. Cl.
CPC ......... *G02B 21/06* (2013.01); *G01N 21/6458* (2013.01); *G01N 21/6486* (2013.01);
(Continued)

(58) Field of Classification Search
CPC ........ G02B 21/06; G02B 21/16; G02B 21/18; G02B 21/36; G02B 21/20; G02B 21/367;
(Continued)

(56) References Cited

U.S. PATENT DOCUMENTS 3,856,986 A    12/1974 Macovski
4,213,706 A    7/1980 Hill et al.
(Continued)

FOREIGN PATENT DOCUMENTS

CN    1292227 C    12/2006
CN    102576209    8/2016
(Continued)

OTHER PUBLICATIONS

Young, "A guide to structured illumination TIRF microscopy at high speed with multiple colors," Journal of Visualized Experiments, 111:1-16 (2016).
(Continued)

*Primary Examiner* — Jie Lei
(74) *Attorney, Agent, or Firm* — Marshall, Gerstein & Borun LLP

(57) ABSTRACT

The disclosure provides for structured illumination microscopy (SIM) imaging systems. In one set of implementations, a SIM imaging system may be implemented as a multi-arm SIM imaging system, whereby each arm of the system includes a light emitter and a beam splitter (e.g., a trans-
(Continued)

missive diffraction grating) having a specific, fixed orientation with respect to the system's optical axis. In a second set of implementations, a SIM imaging system may be implemented as a multiple beam splitter slide SIM imaging system, where one linear motion stage is mounted with multiple beam splitters having a corresponding, fixed orientation with respect to the system's optical axis. In a third set of implementations, a SIM imaging system may be implemented as a pattern angle spatial selection SIM imaging system, whereby a fixed two-dimensional diffraction grating is used in combination with a spatial filter wheel to project one-dimensional fringe patterns on a sample.

20 Claims, 21 Drawing Sheets

(52) U.S. Cl.
CPC ..... *G02B 21/18* (2013.01); *G01N 2021/6471* (2013.01); *G01N 2021/6478* (2013.01)

(58) Field of Classification Search
CPC ............ G02B 21/0076; G02B 21/0048; G02B 27/42; G02B 27/4205; G02B 27/0075; G02B 27/1086; G02B 27/4211; G01N 21/6458; G01N 21/6486; G01N 21/6471; G01N 21/64; G01N 21/4795; G01N 2021/6478; G01N 2021/6471
USPC ........ 359/385, 568, 370, 398, 563, 566, 589
See application file for complete search history.

(56) References Cited

U.S. PATENT DOCUMENTS

| | | | |
|---|---|---|---|
| 5,761,085 A | 6/1998 | Giorgio | |
| 6,188,478 B1 | 2/2001 | Fuchs et al. | |
| 6,438,272 B1 | 8/2002 | Huang et al. | |
| 6,898,004 B2 | 5/2005 | Shimizu et al. | |
| 6,947,127 B2 | 9/2005 | Wolleschensky et al. | |
| 7,274,446 B2 | 9/2007 | Wolleschensky et al. | |
| 7,532,323 B2 | 5/2009 | Tang et al. | |
| 7,803,609 B2 | 9/2010 | Kaplan | |
| 7,848,017 B2 * | 12/2010 | Ouchi ................... | G02B 26/06 359/385 |
| 8,160,379 B2 | 4/2012 | Schaefer et al. | |
| 8,222,040 B2 | 7/2012 | Hong et al. | |
| 8,502,867 B2 | 8/2013 | Park | |
| 8,509,879 B2 | 8/2013 | Durkin et al. | |
| 8,759,077 B2 | 6/2014 | Hong et al. | |
| 8,778,848 B2 | 7/2014 | Lin et al. | |
| 8,796,185 B2 | 8/2014 | Kim et al. | |
| 8,817,362 B2 | 8/2014 | Lee | |
| 8,848,199 B2 | 9/2014 | Choi et al. | |
| 9,458,501 B2 | 10/2016 | Hong et al. | |
| 9,465,228 B2 | 10/2016 | Lee et al. | |
| 9,772,505 B2 | 9/2017 | Lee et al. | |
| 10,378,053 B2 | 8/2019 | Staker et al. | |
| 10,429,665 B2 | 10/2019 | Lee et al. | |
| 2005/0239115 A1 | 10/2005 | Ryu et al. | |
| 2009/0168158 A1 | 7/2009 | Schwertner et al. | |
| 2009/0219607 A1 | 9/2009 | Saggau et al. | |
| 2009/0225407 A1 | 9/2009 | Nakayama et al. | |
| 2009/0238449 A1 | 9/2009 | Zhang et al. | |
| 2009/0250632 A1 | 10/2009 | Kempe et al. | |
| 2010/0321773 A1 | 12/2010 | Chen et al. | |
| 2011/0036996 A1 | 2/2011 | Wolleschensky et al. | |
| 2012/0123581 A1 | 5/2012 | Smilde et al. | |
| 2012/0200901 A1 | 8/2012 | Dubois et al. | |
| 2013/0176622 A1 | 7/2013 | Abrahamsson et al. | |
| 2014/0036057 A1 | 2/2014 | Hayashi et al. | |
| 2014/0320957 A1 * | 10/2014 | Ouchi ................ | G02B 21/0032 359/388 |
| 2015/0185463 A1 | 7/2015 | Ohki et al. | |
| 2016/0124208 A1 | 5/2016 | Best et al. | |
| 2016/0273034 A1 | 9/2016 | Lundquist et al. | |
| 2017/0329122 A1 | 11/2017 | Osawa et al. | |

FOREIGN PATENT DOCUMENTS

| | | |
|---|---|---|
| CN | 104793329 | 6/2017 |
| DE | 102016007839 | 12/2017 |
| JP | 2005080181 | 3/2005 |
| JP | 2006-268004 A | 10/2006 |
| JP | 2011-510344 A | 3/2011 |
| KR | 20040001590 | 1/2004 |
| KR | 10-1117501 | 3/2012 |
| TW | 201341845 | 10/2013 |
| WO | 2009/100830 | 8/2009 |

OTHER PUBLICATIONS

Shao et al., "Three-dimensional resolution doubling in wide-field fluorescence microscopy by structured illumination," Biophysical Journal, 94(12):4957-4970 (2008).

Frohn, J., et al., "Three-dimensional resolution enhancement in fluorescence microscopy by harmonic excitation" Optics Letters 26 (11), 828-830, 2001.

Frohn, J., et al., "True optical resolution beyond the Rayleigh limit achieved by standing wave illumination" PNAS 97 (13), 7232-7236, 2000.

Krishnamurthi, V., et al., "Image processing in 3D standing-wave fluorescence microscopy" Three-Dimensional Microscopy: Image Acquisition and Processing III vol. 2655, International Society for Optics and Photonics, 18-25, Apr. 10, 1996.

* cited by examiner

PATTERN ANGLE SPATIAL SELECTION STRUCTURED ILLUMINATION IMAGING

CROSS-REFERENCE TO RELATED APPLICATIONS

This application is a 35 U.S.C. 371 National Stage of International Patent Application No. PCT/US2019/013504, filed Jan. 14, 2019, which itself claims the benefit of and priority to U.S. Provisional Patent Application 62/618,059, filed Jan. 16, 2018 and Dutch Patent Application No. N2020620, filed Mar. 20, 2018, the content of each of which is incorporated by reference herein in its entirety and for all purposes.

BACKGROUND

Structured illumination microscopy (SIM) describes a technique by which spatially structured (i.e., patterned) light may be used to image a sample to increase the lateral resolution of the microscope by a factor of two or more. In some instances, during imaging of the sample, three images of fringe patterns of the sample are acquired at various pattern phases (e.g., 0°, 120°, and 240°), so that each location on the sample is exposed to a range of illumination intensities, with the procedure repeated by rotating the pattern orientation about the optical axis to 3 separate angles (e.g. 0°, 60° and 120°). The captured images (e.g., nine images) may be assembled into a single image having an extended spatial frequency bandwidth, which may be retransformed into real space to generate an image having a higher resolution than one captured by a conventional microscope.

In some implementations of current SIM systems, a linearly polarized light beam is directed through an optical beam splitter that splits the beam into two or more separate orders that may be combined and projected on the imaged sample as an interference fringe pattern with a sinusoidal intensity variation. Diffraction gratings are examples of beam splitters that can generate beams with a high degree of coherence and stable propagation angles. When two such beams are combined, the interference between them can create a uniform, regularly-repeating fringe pattern where the spacing is determined by factors including the angle between the interfering beams. If more than two beams are combined, the resulting pattern typically contains a mixture of fringe spacings, with the result that the difference between the maximum and minimum intensities (also known as the "modulation depth") is reduced, making it less suitable for SIM purposes.

In some implementations of current SIM systems, the orientation of the projected pattern is controlled by rotating the beam splitting element about the optic axis, and the phase of the pattern is adjusted by moving the element laterally across the axis. In such systems, a diffraction grating is typically mounted on a translation stage, which in turn is mounted on a rotation stage. Additionally, such systems often utilize a linear polarizer to polarize the light emitted by the light source before it is received at the grating.

SUMMARY

Implementations disclosed herein are directed to structured illumination systems and methods.

In a first set of implementations, a SIM imaging system may be implemented as a multi-arm SIM imaging system, where each arm of the system includes a light emitter and a beam splitter (e.g., a transmissive diffraction grating) having a specific, fixed orientation with respect to the system's optical axis.

In one implementation of a multi-arm SIM imaging system, the system includes: a first optical arm, including: a first light emitter to emit light; and a first beam splitter to split light emitted by the first light emitter to project a first plurality of fringes on a plane of a sample; and a second optical arm, including: a second light emitter to emit light; and a second beam splitter to split light emitted by the second light emitter to project a second plurality of fringes on the plane of the sample. In this implementation, the system may also include an optical element to combine an optical path of the first arm and the second arm. Additionally, the system may include an image sensor to collect light emitted by the sample. In some implementations, the sample may include a plurality of features regularly patterned in a rectangular array or hexagonal array.

In some implementations, the first beam splitter includes a first transmissive diffraction grating and the second beam splitter includes a second transmissive diffraction grating. In some implementations, the first beam splitter includes a first reflective diffraction grating and the second beam splitter includes a second reflective diffraction grating. In some implementations, the first and second beam splitters each include a beam splitter cube or plate.

In some implementations, the first and second light emitters emit unpolarized light, and the first and second transmissive diffraction gratings are to diffract unpolarized light emitted by a respective one of the first and second light emitters.

In some implementations, the optical element to combine an optical path of the first plurality of fringes and the second plurality of fringes includes a mirror with holes, with the mirror arranged to reflect light diffracted by the first diffraction grating and with the holes arranged to pass through at least first orders of light diffracted by the second diffraction grating. In some implementations, the optical element to combine an optical path of the first arm and the second arm includes a polarizing beam splitter, where the first diffraction grating diffracts vertically polarized light and where the second diffraction grating diffracts horizontally polarized light.

In some implementations, the multi-arm SIM imaging system includes one or more optical elements to phase shift the first plurality of fringes and the second plurality of fringes.

In some implementations, the one or more optical elements to phase shift the first plurality of fringes and the second plurality of fringes include a first rotating optical window to phase shift the first plurality of fringes and a second rotating optical window to phase shift the second plurality of optical fringes. In some implementations, the one or more optical elements to phase shift the first plurality of fringes and the second plurality of fringes include a first linear motion stage to translate the first diffraction grating and a second linear motion stage to translate the second diffraction grating. In some implementations, the one or more optical elements to phase shift the first plurality of fringes and the second plurality of fringes include a single rotating optical window, where the single rotating optical window is positioned after the mirror with holes in an optical path to the sample.

In some implementations, an axis of rotation of the single rotating optical window is offset by about 45 degrees from an optical axis of each of the gratings.

In some implementations, the first plurality of fringes are angularly offset from the second plurality of fringes on the sample plane by about 90 degrees.

In some implementations, the system also includes: an objective lens to project each of the first plurality of fringes and the second plurality of fringes on the sample.

In some implementations, the system also includes: one or more optical beam blockers for blocking zero orders of light emitted by each of the first and second diffraction gratings. In particular implementations, the one or more optical beam blocks include a Bragg grating.

In one implementation of a multi-arm SIM imaging system, a method includes: turning on a first optical arm of a structured illumination system, the first optical arm comprising a first light emitter to emit light and a first diffraction grating to diffract light emitted by the first light emitter to project a first plurality of fringes oriented in a specific direction on a plane of a sample; capturing a first plurality of phase images of the sample, where during capture of the first plurality of images, the positions of the first plurality of fringes are shifted on the plane of the sample; turning on a second optical arm of the structured illumination system, the second optical arm comprising a second light emitter to emit light and a second diffraction grating to diffract light emitted by the second light emitter to project a second plurality of fringes on the plane of the sample, where the second plurality of fringes are angularly offset from the first plurality of fringes on the plane of the sample; and capturing a second plurality of phase images of the sample illuminated with the second plurality of fringes, where during capture of the second plurality of fringes, the positions of the second plurality of fringes are shifted on the plane of the sample. In implementations of this method, the first diffraction grating and the second diffraction grating are transmissive diffraction gratings, where the structured illumination system includes a mirror with holes to reflect light diffracted by the first diffraction grating and to pass through at least first orders of light diffracted by the second diffraction grating.

In implementations, the method further includes: using at least the first plurality of captured phase images and the second plurality of captured phased images to computationally reconstruct one or more images having higher resolution than each of the first and second pluralities of captured phased images. In implementations, the first plurality of fringes are angularly offset from the second plurality of fringes on the sample plane by about 90 degrees.

In implementations, the first plurality of fringes and the second plurality of fringes are phase shifted by rotating a single optical window positioned in an optical path between the sample and each of the first and second gratings, where an axis of rotation of the single rotating optical window is offset from an optical axis of each of the gratings.

In implementations of the method, the first optical arm is turned off and the second optical arm of the structured illumination system is turned on after capturing the first plurality of phase images.

In implementations of the method, the first diffraction grating and the second diffraction grating are mechanically fixed during image capture.

In a second set of implementations, a SIM imaging system may be implemented as a multiple beam splitter slide SIM imaging system, where one linear motion stage is mounted with multiple beam splitters having a corresponding, fixed orientation with respect to the system's optical axis.

In one implementation of a multiple beam splitter slide SIM imaging system, the system includes: a light emitter to emit light; a linear motion stage mounted with a first beam splitter and a second beam splitter, where the first beam splitter is to split light emitted by the light emitter to project a first plurality of fringes on a plane of a sample, and where the second beam splitter is to split light emitted by the light emitter to project a second plurality of fringes on the plane of the sample; and an image sensor to collect light emitted by the sample. In implementations, the linear motion stage is a one-dimensional linear motion stage, where the linear motion stage is to translate along the one dimension to optically couple each of the first beam splitter and the second beam splitter to the light emitter, where the first beam splitter is adjacent to the second beam splitter along the one dimension. In implementations, the first plurality of fringes are angularly offset from the second plurality of fringes on the sample plane by about 90 degrees.

In implementations, the first beam splitter includes a first transmissive diffraction grating and the second beam splitter includes a second transmissive diffraction grating. The first diffraction grating and the second diffraction grating may be angularly offset from the one dimension (i.e., rotated around the propagation direction of light). In particular implementations, the first diffraction grating and the second diffraction grating are angularly offset from the one dimension by about ±45 degrees.

In some implementations, the first diffraction grating and the second diffraction grating may be integrated into a single optical element mounted on the linear motion stage. In implementations where the diffraction gratings are integrated into a single optical element, the single optical element may include a first side patterned with the first diffraction grating and a second side, adjacent the first side, patterned with the second diffraction grating.

In some implementations, the system may further include: one or more optical beam blockers for blocking zero orders of light emitted by each of the first and second diffraction gratings.

In some implementations, the system may further include: a projection lens in an optical path between the linear motion stage and the objective lens. The projection lens may be to project a Fourier transform of each of the first diffraction grating and the second diffraction into an entrance pupil of the objective.

In some implementations, the system may further include an alignment pattern formed on a component mounted on the linear motion stage, where the alignment pattern splits light emitted by the light emitter to project a pattern on the plane of the sample for imaging alignment. The alignment pattern may be formed on a substrate including at least one of the first diffraction grating and the second diffraction grating. The projected pattern may include lines having a lower frequency than the projected first plurality of fringes and second plurality of fringes.

In some implementations, the system may further include: an optical phase modulator to phase shift the first plurality of fringes and second plurality of fringes that are projected on the plane of the sample. In such implementations, the optical phase modulator may be a separate component from the linear motion stage.

In one implementation of a multiple beam splitter slide SIM imaging system, a method includes: turning on a light emitter of a structured illumination imaging system, the structured illumination imaging system including a one-dimensional linear motion stage mounted with a first diffraction grating and a second diffraction grating, where the linear motion stage is to translate along one dimension; translating the linear motion stage along the one dimension to phase shift a first plurality of fringes projected by the first diffraction grating on a sample; translating the linear motion stage to optically couple the second diffraction grating to the light emitter; and after optically coupling the second diffraction grating to the light emitter, translating the linear motion stage along the one dimension to phase shift a second plurality of fringes projected by the second diffraction grating on the sample. The first diffraction grating and the second diffraction grating may be transmissive diffraction gratings and may be angularly offset from the one dimension of translation. For example, the first diffraction grating and the second diffraction grating may be angularly offset from the one dimension by about ±45 degrees.

In implementations, the method may further include: translating the linear motion stage along the one dimension a plurality of times to phase shift, a plurality of times, the first plurality of fringes projected by the first diffraction grating on the sample; and after optically coupling the second diffraction grating to the light emitter, translating the linear motion stage along the one dimension a plurality of times to phase shift, a plurality of times, the second plurality of fringes projected by the second diffraction grating on the sample.

In implementations, the method may further include: capturing an image of the sample after each time that the linear motion stage is translated to phase shift the first plurality of fringes; and capturing an image of the sample after each time that the linear motion stage is translated to phase shift the second plurality of fringes. The captured images may be used to computationally reconstruct an image having a higher resolution than each of the captured images.

In implementations of the method, the linear motion stage is translated about the same distance along the one dimension each time the first plurality of fringes or the second plurality of fringes are phased shifted on the sample.

In particular implementations, the linear motion is stage is translated between about 10 mm and 15 mm when the second diffraction grating is optically coupled to the light emitter.

In a third set of implementations, a SIM imaging system may be implemented as a pattern angle spatial selection SIM imaging system, whereby a fixed two-dimensional diffraction grating is used in combination with a spatial filter wheel to project one-dimensional fringe patterns on a sample.

In one implementation of a pattern angle spatial selection SIM imaging system, the system includes: a light emitter to emit light; a two-dimensional diffraction grating to diffract light emitted by the light emitter to project a first plurality of fringes oriented in a first direction on a sample plane and to project a second plurality of fringes oriented in a second direction, perpendicular to the first direction, on the sample plane; and a spatial filter wheel to pass through diffracted light received from the two-dimensional diffraction grating in a respective one of the first or second directions and block light in a respective one of the first or second directions, the spatial filter wheel comprising a first plurality of apertures and a second plurality of apertures orthogonal to the first plurality of apertures. The first plurality of apertures may be to pass through light diffracted by the two-dimensional diffraction in the first direction and the second plurality of apertures may be to pass through light diffracted by the two-dimensional diffraction in the second direction.

In some implementations, the system further includes: a beam blocking element to block 0th order light transmitted by the two-dimensional diffraction grating. In particular implementations, the beam blocking element includes a diffractive optical element patterned to reflect light normal to the element and pass through light at other angles.

In some implementations, the spatial filter wheel is to reflect diffraction orders of light received from the two-dimensional diffraction grating that are not passed through.

In some implementations, the two-dimensional diffraction grating is a transmissive diffraction grating. The transmissive diffraction grating may be disposed over or formed on a face of a solid optic that receives light from the light emitter.ABdispersion angles of the transmissive diffraction grating may be arranged such that 0th order light is blocked on a far side of the solid optic. In some implementations, the solid optic includes angled faces to diffract and output first orders of light diffracted by the two-dimensional transmissive diffraction grating. In particular implementations, the angled faces include a focusing lens. In some implementations, a projection lens receives light output by the solid optic.

In some implementations, the two-dimensional diffraction grating is a two-dimensional reflective diffraction grating. The two-dimensional reflective diffraction grating may be disposed over or formed on a face of the solid optic opposite an aperture of the solid optic that receives light from the light emitter. The solid optic may include reflective internal faces to reflect and output first orders of light diffracted by the two-dimensional reflective diffraction grating through outlet faces of the solid optic. In particular implementations, the outlet faces include a diffractive focusing lens. In some implementations, a projection lens is to receive light output by the solid optic.

In some implementations, the system further includes: one or more optical elements to phase shift the first plurality of fringes and the second plurality of fringes. In particular implementations, the one or more optical elements to phase shift the first plurality of fringes and the second plurality of fringes comprise a parallel plate optic tilted in two perpendicular directions.

In one implementation of a pattern angle spatial selection SIM imaging system, a method includes: turning on a light emitter of a structured illumination imaging system, the structured illumination imaging system including a two-dimensional diffraction grating; receiving light emitted by the light emitter at the two-dimensional diffraction grating to output first diffracted light oriented in a first direction and second diffracted light oriented in a second direction perpendicular to the first direction; passing the first diffracted light through a first plurality of apertures of a spatial filter wheel and blocking the second diffracted light at the spatial filter wheel; projecting the first diffracted light the passed through the first plurality of holes as a first plurality of fringes on a sample plane; and capturing a first plurality of phase images of light emitted by the sample, wherein during capture of the first plurality of images, the first plurality of fringes are phase shifted on the sample plane. The first plurality of fringes may be phase shifted by moving the sample (e.g., using a motion stage), by moving the projected fringes, or by moving both the sample and projected fringes.

In implementations, the method further includes: rotating the spatial filter wheel such that it passes the second diffracted light through a second plurality of apertures of the spatial filter wheel and blocks the first diffracted light at the spatial filter wheel; projecting the second diffracted light that passes through the second plurality of holes as a second plurality of fringes, orthogonal to the first plurality of fringes, on the sample plane; and capturing a second plurality of phase images of light emitted by the sample, where during capture of the second plurality of images, the second plurality of fringes are phase shifted on the sample plane.

In particular implementations of the method, the two-dimensional diffraction grating is a two-dimensional transmissive diffraction grating formed on or disposed over a face of a solid optic, and the method further includes: blocking 0th order light output by the transmissive diffraction grating at a side of the solid optic opposite the transmissive diffraction grating; and diffracting and outputting, from angled faces of the solid optic, first orders of light diffracted by the two-dimensional transmissive diffraction grating.

In particular implementations of the method, the two-dimensional diffraction grating is a two-dimensional reflective diffraction grating formed on or disposed over a face of a solid optic opposite an aperture of the solid optic that receives light from the light emitter, and the method further includes: reflecting, at faces of the solid optic, first orders of light diffracted by the two-dimensional reflective diffraction grating.

Other features and aspects of the disclosed technology will become apparent from the following detailed description, taken in conjunction with the accompanying drawings, which illustrate, by way of example, the features in accordance with some implementations described herein of the disclosed technology. The summary is not intended to limit the scope of any inventions described herein, which are defined by the claims and equivalents.

It should be appreciated that all combinations of the foregoing concepts (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF THE DRAWINGS

The present disclosure, in accordance with one or more implementations, is described in detail with reference to the following figures. The figures are provided for purposes of illustration only and merely depict example implementations. Furthermore, it should be noted that for clarity and ease of illustration, the elements in the figures have not necessarily been drawn to scale.

Some of the figures included herein illustrate various implementations of the disclosed technology from different viewing angles. Although the accompanying descriptive text may refer to such views as "top," "bottom" or "side" views, such references are merely descriptive and do not imply or require that the disclosed technology be implemented or used in a particular spatial orientation unless explicitly stated otherwise.

Figure 1:
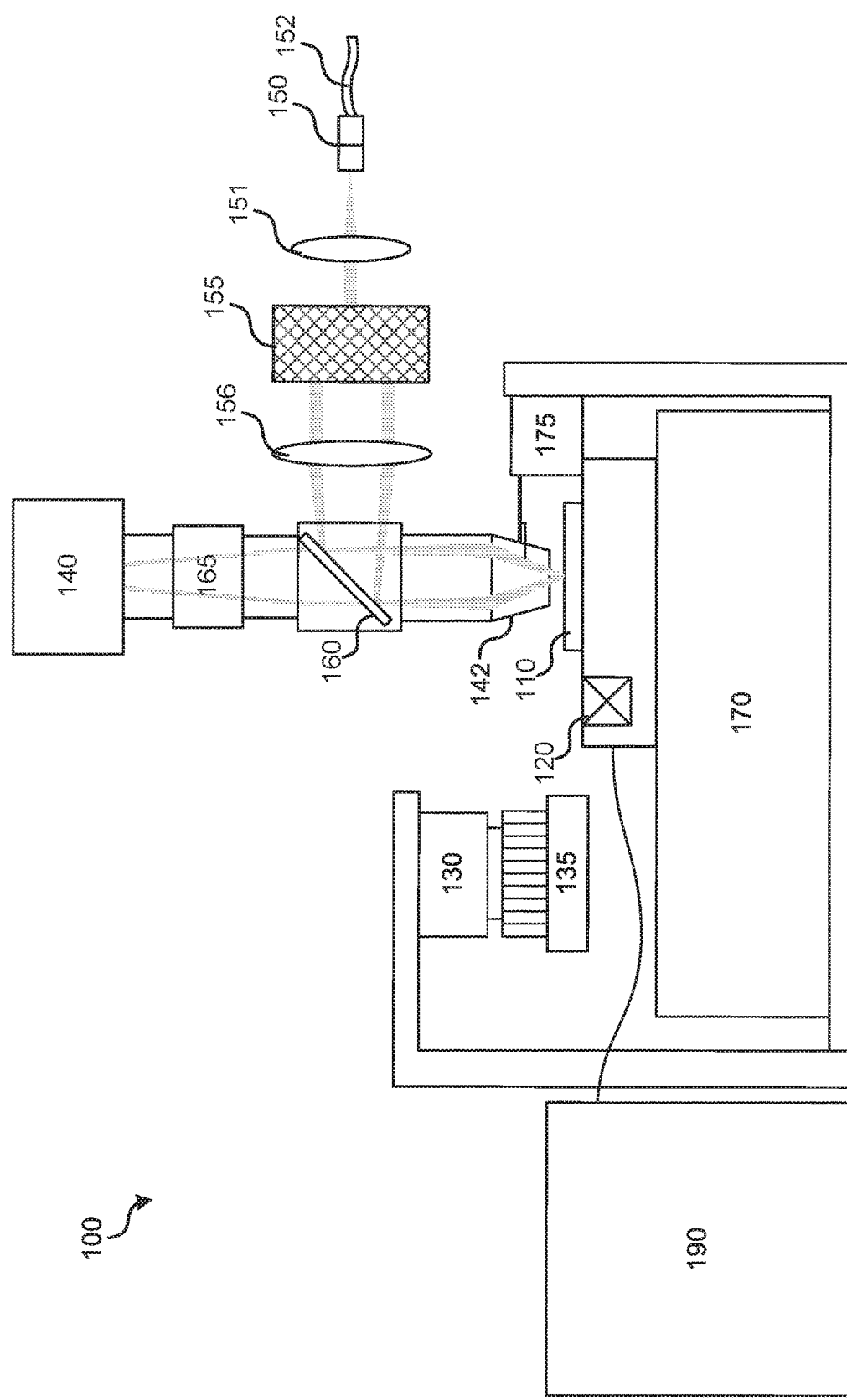
FIG. 1 illustrates a structured illumination imaging system that illuminates a sample with spatially structured light, in accordance with some implementations described herein.

The figures are not exhaustive and do not limit the present disclosure to the precise form disclosed.

DETAILED DESCRIPTION

As used herein to refer to light diffracted by a diffraction grating, the term "order" or "order number" is intended to mean the number of integer wavelengths that represents the path length difference of light from adjacent slits or structures of the diffraction grating for constructive interference. The interaction of an incident light beam on a repeating series of grating structures or other beam splitting structures can redirect or diffract portions of the light beam into predictable angular directions from the original beam. The term "zeroth order" or "zeroth order maximum" is intended to refer to the central bright fringe emitted by a diffraction grating in which there is no diffraction. The term "first-order" is intended to refer to the two bright fringes diffracted to either side of the zeroth order fringe, where the path length difference is ±1 wavelengths. Higher orders are diffracted into larger angles from the original beam. The properties of the grating can be manipulated to control how much of the beam intensity is directed into various orders. For example, a phase grating can be fabricated to maximize the transmission of the ±1 orders and minimize the transmission of the zeroth order beam.

As used herein to refer to a sample, the term "feature" is intended to mean a point or area in a pattern that can be distinguished from other points or areas according to relative location. An individual feature can include one or more molecules of a particular type. For example, a feature can include a single target nucleic acid molecule having a particular sequence or a feature can include several nucleic acid molecules having the same sequence (and/or complementary sequence, thereof).

As used herein, the term "xy plane" is intended to mean a 2-dimensional area defined by straight line axes x and y in a Cartesian coordinate system. When used in reference to a detector and an object observed by the detector, the area can be further specified as being orthogonal to the beam axis, or the direction of observation between the detector and object being detected.

As used herein, the term "z coordinate" is intended to mean information that specifies the location of a point, line or area along an axis that is orthogonal to an xy plane. In particular implementations, the z axis is orthogonal to an area of an object that is observed by a detector. For example, the direction of focus for an optical system may be specified along the z axis.

As used herein, the term "optically coupled" is intended to refer to one element being adapted to impart light to another element directly or indirectly.

As noted above, pre-existing implementations of SIM systems mount a diffraction grating on a translation stage, which in turn is mounted on a rotation stage. Additionally, such systems often utilize a linear polarizer for polarizing the light source before it is received at the grating. This pre-existing design suffers from a number of drawbacks for use in a high-throughput microscopy system. First, because a rotation stage must rotate the grating several times during acquisition of an image set (e.g., three times), this slows down the instrument's speed and affects its stability. Typically, the fastest grating stages can rotate is on the order of tens of milliseconds (ms), which imposes a mechanical throughput limit on imaging speed. Second, the pre-existing design has poor repeatability because mechanical tolerances of the rotation stage limit the repeatability of the structured illumination patterns from one image acquisition set to the next. This also imposes a higher cost on the SIM system as it requires a very precise rotation stage.

Third, the pre-existing SIM design is not the most reliable for use in a high-throughput microscopy system because of the number of actuations that are made to rotate the grating. For example, if one SIM image set is acquired every second, the rotation stage may require millions to tens of millions actuations per year. Fourth, the pre-existing SIM design has low optical efficiency because the linear polarizer blocks at least 50% of the light received at the grating.

To this end, implementations of the technology disclosed herein are directed to improved SIM systems and methods.

In accordance with a first set of implementations of the technology disclosed herein, a SIM imaging system may be implemented as a multi-arm SIM imaging system, whereby each arm of the system includes a light emitter and a beam splitter (e.g., a transmissive diffraction grating) having a specific, fixed orientation with respect to the optical axis of the system. In accordance with these implementations, the beam splitters in the SIM imaging system are rotatably fixed (i.e., do not require mechanical rotation), which may provide improved system speed, reliability, and repeatability. For systems where the objects being imaged are oriented primarily along 2 perpendicular axes (i.e. vertical and horizontal), it is possible to achieve enhanced spatial resolution using 2 pattern angles, instead of the 3 angles typically used for randomly-oriented objects. In particular implementations, the system may be implemented as a two-arm SIM imaging system including a fixed vertical grating and a fixed horizontal grating to project respective fringe patterns on an imaged sample. Other pairs of orthogonal grating and pattern angles can be used, provided they are aligned with the orientation of sample objects. Additionally, the system may include a mirror with holes to combine the two arms into the optical path in a lossless manner.

In accordance with a second set of implementations of the technology disclosed herein, a SIM imaging system may be implemented as a multiple beam splitter slide SIM imaging system, where one linear motion stage is mounted with a plurality of beam splitters (e.g., diffraction gratings) having a corresponding, fixed orientation with respect to the optical axis of the system. In particular implementations, the SIM imaging system may be implemented as a dual optical grating slide SIM imaging system whereby all phase shifts or rotations of the grating pattern projected on imaged sample may be made by linearly translating a motion stage along a single axis of motion, to select one of two gratings or to effect a phase shift of the pattern generated by a selected grating. In such implementations, only a single optical arm having a single emitter and single linear motion stage is needed to illuminate a sample, which may provide system advantages such as reducing the number of moving system parts to improve speed, complexity and cost. Additionally, in such implementations, the absence of a polarizer may provide the advantage of high optical efficiency.

In accordance with a third set of implementations of the technology disclosed herein, a SIM imaging system may be implemented as a pattern angle spatial selection SIM imaging system, whereby a fixed two-dimensional diffraction grating is used in combination with a spatial filter wheel to project one-dimensional diffraction patterns on a sample. In such implementations, the primary optical components of the imaging system may remain stationary, which may improve the stability of the optical system (and of the illumination pattern) and minimize the weight, vibration output, and cost of the moving elements of the system.

Before describing various implementations of the systems and methods disclosed herein, it is useful to describe an example environment with which the technology disclosed herein can be implemented. One such example environment is that of a structured illumination imaging system 100, illustrated in FIG. 1, that illuminates a sample with spatially structured light. For example, system 100 may be a structured illumination fluorescence microscopy system that utilizes spatially structured excitation light to image a biological sample.

In the example of FIG. 1, a light emitter 150 is configured to output a light beam that is collimated by collimation lens 151. The collimated light is structured (patterned) by light structuring optical assembly 155 and directed by dichroic mirror 160 through objective lens 142 onto a sample of a sample container 110, which is positioned on a motion stage 170. In the case of a fluorescent sample, the sample fluoresces in response to the structured excitation light, and the resultant light is collected by objective lens 142 and directed to an image sensor of camera system 140 to detect fluorescence.

Light structuring optical assembly 155 in various implementations, further described below, includes one or more optical diffraction gratings or other beam splitting elements (e.g., a beam splitter cube or plate) to generate a pattern of light (e.g., fringes, typically sinusoidal) that is projected onto samples of a sample container 110. The diffraction gratings may be one-dimensional or two-dimensional transmissive or reflective gratings. The diffraction gratings may be sinusoidal amplitude gratings or sinusoidal phase gratings.

As further described below with reference to particular implementations, in system 100 the diffraction gratings do not require a rotation stage like the typical structured illumination microscopy system of preexisting systems discussed above. In some implementations, the diffraction gratings may be fixed during operation of the imaging system (i.e., not require rotational or linear motion). For example, in a particular implementation, further described below, the diffraction gratings may include two fixed one-dimensional transmissive diffraction gratings oriented perpendicular to each other (e.g., a horizontal diffraction grating and vertical diffraction grating).

As illustrated in the example of FIG. 1, light structuring optical assembly 155 outputs the first orders of the diffracted light beams (e.g., m=±1 orders) while blocking or minimizing all other orders, including the zeroth orders. However, in alternative implementations, additional orders of light may be projected onto the sample.

During each imaging cycle, imaging system 100 utilizes light structuring optical assembly 155 to acquire a plurality of images at various phases, with the fringe pattern displaced laterally in the modulation direction (e.g., in the x-y plane and perpendicular to the fringes), with this procedure repeated one or more times by rotating the pattern orientation about the optical axis (i.e., with respect to the x-y plane of the sample). The captured images may then be computationally reconstructed to generate a higher resolution image (e.g., an image having about twice the lateral spatial resolution of individual images).

In system 100, light emitter 150 may be an incoherent light emitter (e.g., emit light beams output by one or more excitation diodes), or a coherent light emitter such as emitter of light output by one or more lasers or laser diodes. As illustrated in the example of system 100, light emitter 150 includes an optical fiber 152 for guiding an optical beam to be output. However, other configurations of a light emitter 150 may be used. In implementations utilizing structured illumination in a multi-channel imaging system (e.g., a multi-channel fluorescence microscope utilizing multiple wavelengths of light), optical fiber 152 may optically couple to a plurality of different light sources (not shown), each light source emitting light of a different wavelength. Although system 100 is illustrated as having a single light emitter 150, in some implementations multiple light emitters 150 may be included. For example, multiple light emitters may be included in the case of a structured illumination imaging system that utilizes multiple arms, further discussed below.

In some implementations, system 100 may include a projection lens 156 that may include a lens element to articulate along the z-axis to adjust the structured beam shape and path. For example, a component of the projection lens may be articulated to account for a range of sample thicknesses (e.g., different cover glass thickness) of the sample in container 110.

In the example of system 100, fluid delivery module or device 190 may direct the flow of reagents (e.g., fluorescently labeled nucleotides, buffers, enzymes, cleavage reagents, etc.) to (and through) sample container 110 and waste valve 120. Sample container 110 can include one or more substrates upon which the samples are provided. For example, in the case of a system to analyze a large number of different nucleic acid sequences, sample container 110 can include one or more substrates on which nucleic acids to be sequenced are bound, attached or associated. The substrate can include any inert substrate or matrix to which nucleic acids can be attached, such as for example glass surfaces, plastic surfaces, latex, dextran, polystyrene surfaces, polypropylene surfaces, polyacrylamide gels, gold surfaces, and silicon wafers. In some applications, the substrate is within a channel or other area at a plurality of locations formed in a matrix or array across the sample container 110. System 100 also may include a temperature station actuator 130 and heater/cooler 135 that can optionally regulate the temperature of conditions of the fluids within the sample container 110.

In particular implementations, the sample container 110 may be implemented as a patterned flow cell including a translucent cover plate, a substrate, and a liquid contained therebetween, and a biological sample may be located at an inside surface of the translucent cover plate or an inside surface of the substrate. The flow cell may include a large number (e.g., thousands, millions, or billions) of wells or regions that are patterned into a defined array (e.g., a hexagonal array, rectangular array, etc.) into the substrate. Each region may form a cluster (e.g., a monoclonal cluster) of a biological sample such as DNA, RNA, or another genomic material which may be sequenced, for example, using sequencing by synthesis. The flow cell may be further divided into a number of spaced apart lanes (e.g., eight lanes), each lane including a hexagonal array of clusters. Example flow cells that may be used in implementations disclosed herein are described in U.S. Pat. No. 8,778,848.

Sample container 110 can be mounted on a sample stage 170 to provide movement and alignment of the sample container 110 relative to the objective lens 142. The sample stage can have one or more actuators to allow it to move in any of three dimensions. For example, in terms of the Cartesian coordinate system, actuators can be provided to allow the stage to move in the X, Y and Z directions relative to the objective lens. This can allow one or more sample locations on sample container 110 to be positioned in optical alignment with objective lens 142. Movement of sample stage 170 relative to objective lens 142 can be achieved by moving the sample stage itself, the objective lens, some other component of the imaging system, or any combination of the foregoing. In some implementations, movement of sample stage 170 may be implemented during structured illumination imaging to move structured illumination fringes with respect to the sample to change phases. Further implementations may also include moving the entire imaging system over a stationary sample. Alternatively, sample container 110 may be fixed during imaging.

In some implementations, a focus (z-axis) component 175 may be included to control positioning of the optical components relative to the sample container 110 in the focus direction (typically referred to as the z axis, or z direction). Focus component 175 can include one or more actuators physically coupled to the optical stage or the sample stage, or both, to move sample container 110 on sample stage 170 relative to the optical components (e.g., the objective lens 142) to provide proper focusing for the imaging operation. For example, the actuator may be physically coupled to the respective stage such as, for example, by mechanical, magnetic, fluidic or other attachment or contact directly or indirectly to or with the stage. The one or more actuators can be configured to move the stage in the z-direction while maintaining the sample stage in the same plane (e.g., maintaining a level or horizontal attitude, perpendicular to the optical axis). The one or more actuators can also be configured to tilt the stage. This can be done, for example, so that sample container 110 can be leveled dynamically to account for any slope in its surfaces.

It should be appreciated that although FIG. 1 illustrates the use of an objective lens 142 for combining and projecting the two beam orders on the imaged sample as an interference fringe pattern, other suitable means may be used to combine the two beams and/or project the interference pattern on the sample. Any means of redirecting the beams may suffice (e.g., using mirrors), provided the path length traversed by the beams is within a temporal coherence length of the beams. Additionally, in some implementations, the two beam orders may automatically overlay for a distance beyond the beam splitter (e.g., diffraction grating). In such implementations, an interference pattern may appear near the grating, removing the requirement of an additional projection system if the diffraction grating is placed sufficiently close to the sample. As such, it should be appreciated that implementations for SIM described herein may apply to systems that do not rely on objective lens systems to project interference patterns.

The structured light emanating from a test sample at a sample location being imaged can be directed through dichroic mirror 160 to one or more detectors of camera system 140. In some implementations, a filter switching assembly 165 with one or more emission filters may be included, where the one or more emission filters can be used to pass through particular emission wavelengths and block (or reflect) other emission wavelengths. For example, the one or more emission filters may be used to switch between different channels of the imaging system. In a particular implementation, the emission filters may be implemented as dichroic mirrors that direct emission light of different wavelengths to different image sensors of camera system 140.

Camera system 140 can include one or more image sensors to monitor and track the imaging (e.g., sequencing) of sample container 110. Camera system 140 can be implemented, for example, as a charge-coupled device (CCD) image sensor camera, but other image sensor technologies such as active pixel sensors (e.g., complementary metal-oxide-semiconductor (CMOS) image sensors) can be used. In some implementations, structured illumination imaging system 100 may utilize an image sensor (e.g., active pixel sensor) in an active plane of the sample. In such implementations, the imaged sample may be patterned and/or aligned over the image sensor.

Output data (e.g., images) from camera system 140 may be communicated to a real-time analysis module (not shown) that may be implemented as a software application that, as further described below, may reconstruct the images captured during each imaging cycle to create an image having a higher spatial resolution. Alternatively, the output data may be stored for reconstruction at a later time.

Although not illustrated, a controller can be provided to control the operation of structured illumination imaging system 100, including synchronizing the various optical components of system 100. The controller can be implemented to control aspects of system operation such as, for example, configuration of light structuring optical assembly 155 (e.g., selection and/or linear translation of diffraction gratings), movement of projection lens 156, focusing, stage movement, and imaging operations. In various implementations, the controller can be implemented using hardware, algorithms (e.g., machine executable instructions), or a combination of the foregoing. For example, in some implementations the controller can include one or more CPUs or processors with associated memory. As another example, the controller can comprise hardware or other circuitry to control the operation, such as a computer processor and a non-transitory computer readable medium with machine-readable instructions stored thereon. For example, this circuitry can include one or more of the following: field programmable gate array (FPGA), application specific integrated circuit (ASIC), programmable logic device (PLD), complex programmable logic device (CPLD), a programmable logic array (PLA), programmable array logic (PAL) or other similar processing device or circuitry. As yet another example, the controller can comprise a combination of this circuitry with one or more processors.

Multi-Arm Structured Illumination Microscopy Imaging System

In accordance with some implementations of the technology disclosed herein, the SIM imaging system may be implemented as a multi-arm SIM imaging system, where each arm of the system includes a light emitter and a grating having a specific, fixed orientation with respect to the optical axis of the system.

Figure 2:
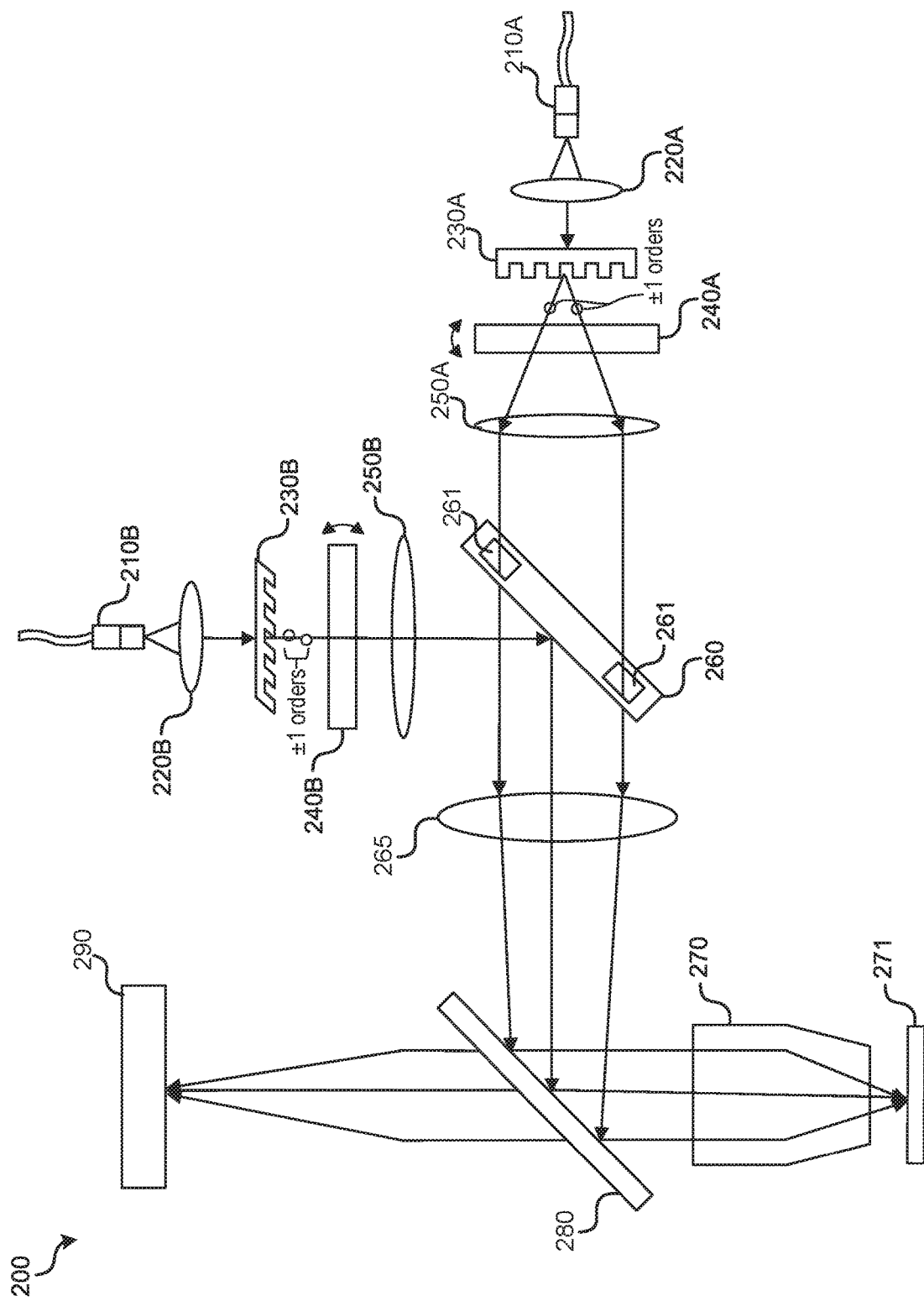
FIG. 2 is an optical diagram illustrating one example optical configuration of a two-arm structured illumination microscopy (SIM) imaging system, in accordance with some implementations described herein.

FIG. 2 is an optical diagram illustrating one example optical configuration of a two-arm SIM imaging system 200 in accordance with some implementations described herein. The first arm of system 200 includes a light emitter 210A, an optical collimator 220A to collimate light output by light emitter 210A, a diffraction grating 230A in a first orientation with respect to the optical axis, a rotating window 240A, and a projection lens 250A. The second arm of system 200 includes a light emitter 210B, an optical collimator 220B to collimate light output by light emitter 210B, a diffraction grating 230B in a second orientation with respect to the optical axis, a rotating window 240B, and a projection lens 250B. Although diffraction gratings are illustrated in this example, in other implementations, other beam splitting elements such as a beam splitter cube or plate may be used to split light received at each arm of SIM imaging system 200.

Each light emitter 210A-210B may be an incoherent light emitter (e.g., emit light beams output by one or more light emitting diodes (LEDs)), or a coherent light emitter such as emitter of light output by one or more lasers or laser diodes. In the example of system 200, each light emitter 210A-210B is an optical fiber that outputs an optical beam that is collimated by a respective collimator 220A-220B.

In some implementations, each optical fiber may be optically coupled to a corresponding light source (not shown) such as a laser. During imaging, each optical fiber may be switched on or off using a high-speed shutter (not shown) positioned in the optical path between the fiber and the light source, or by pulsing the fiber's corresponding light source at a predetermined frequency during imaging. In some implementations, each optical fiber may be optically coupled to the same light source. In such implementations, a beam splitter or other suitable optical element may be used to guide light from the light source into each of the optical fibers. In such examples, each optical fiber may be switched on or off using a high-speed shutter (not shown) positioned in the optical path between the fiber and beam splitter.

In example SIM imaging system 200, the first arm includes a fixed vertical grating 230A to project a grating pattern in a first orientation (e.g., a vertical fringe pattern) onto the sample, and the second arm includes a fixed horizontal grating 230B to project a grating pattern in a second orientation (e.g., a horizontal fringe pattern) onto the sample 271. Unlike in pre-existing SIM imaging systems, the gratings of SIM imaging system 200 do not need to be mechanically rotated or translated, which may provide improved system speed, reliability, and repeatability.

As illustrating in the example of FIG. 2, gratings 230A-230B may be transmissive diffraction gratings, including a plurality of diffracting elements (e.g., parallel slits or grooves) formed into a glass substrate or other suitable surface. The gratings may be implemented as phase gratings that provide a periodic variation of the refractive index of the grating material. The groove or feature spacing may be chosen to diffract light at suitable angles and tuned to the minimum resolvable feature size of the imaged samples for operation of SIM imaging system 200. In other implementations, the gratings may be reflective diffraction gratings.

In the example of SIM imaging system 200, the vertical and horizontal patterns are offset by about 90 degrees. In other implementations, other orientations of the gratings may be used to create an offset of about 90 degrees. For example, the gratings may be oriented such that they project images that are offset ±45 degrees from the x or y plane of sample 271. The configuration of example SIM imaging system 200 may be particularly advantageous in the case of a regularly patterned sample 271 with features on a rectangular grid, as structured resolution enhancement can be achieved using only two perpendicular gratings (e.g., vertical grating and horizontal grating).

Gratings 230A-230B, in the example of system 200, are configured to diffract the input beams into a number of orders (e.g., 0 order, ±1 orders, ±2 orders, etc.) of which the ±1 orders may be projected on the sample 271. As shown in this example, vertical grating 230A diffracts a collimated light beam into first order diffracted beams (±1 orders), spreading the first orders on the plane of the page, and horizontal grating 230B diffracts a collimated light beam into first order diffracted beams, spreading the orders above and below the plane of the page (i.e., in a plane perpendicular to the page). To improve efficiency of the system, the zeroth order beams and all other higher order beams (i.e., ±2 orders or higher) may be blocked (i.e., filtered out of the illumination pattern projected on the sample 271). For example, a beam blocking element (not shown) such as an order filter may be inserted into the optical path after each diffraction grating to block the 0-order beam and the higher order beams. In some implementations, diffraction gratings 230A-230B may configured to diffract the beams into only the first orders and the 0-order (undiffracted beam) may be blocked by some beam blocking element.

Each arm includes an optical phase modulator or phase shifter 240A-240B to phase shift the diffracted light output by each of gratings 230. For example, during structured imaging, the optical phase of each diffracted beam may be shifted by some fraction (e.g., ½, ⅓, ¼, etc.) of the pitch (λ) of each fringe of the structured pattern. In the example of FIG. 2, phase modulators 240A and 240B are implemented as rotating windows that may use a galvanometer or other rotational actuator to rotate and modulate the optical pathlength of each diffracted beam. For example, window 240A may rotate about the vertical axis to shift the image projected by vertical grating 230A on sample 271 left or right, and window 240B may rotate about the horizontal axis to shift the image projected by horizontal grating 230B on sample 271 up or down.

In other implementations, further described below, other phase modulators that change the optical path length of the diffracted light (e.g. linear translation stages, wedges, etc.) may be used. Additionally, although optical phase modulators 240A-240B are illustrated as being placed after gratings 230A-230B, in other implementations they may be placed at other locations in the illumination system. In some implementations, a single phase modulator may be operated in two different directions for the different fringe patterns, or a single phase modulator may use a single motion to adjust both of the path lengths, as described below.

In example system 200, a mirror 260 with holes 261 combines the two arms into the optical path in a lossless manner (e.g., without significant loss of optical power, other than a small absorption in the reflective coating). Mirror 260 can be located such that the diffracted orders from each of the gratings are spatially resolved, and the unwanted orders can be blocked. Mirror 260 passes the first orders of light output by the first arm through holes 261. Mirror 260 reflects the first orders of light output by the second arm. As such, the structured illumination pattern may be switched from a vertical orientation (e.g., grating 230A) to a horizontal orientation (e.g., grating 230B) by turning each emitter on or off or by opening and closing an optical shutter that directs a light source's light through the fiber optic cable. In other implementations, the structured illumination pattern may be switched by using an optical switch to change the arm that illuminates the sample.

Also illustrated in example imaging system 200 are a projection lens 265, a semi-reflective mirror 280, objective 270, and camera 290. The projection lens 265 may be utilized in conjunction with lens 250A to project the Fourier transform of grating 230A into the entrance pupil of the objective lens 270. Similarly, the projection lens 265 may be utilized in conjunction with lens 250B to project the Fourier transform of grating 230B into the entrance pupil of the objective lens 270. The projection lens 265 may also be implemented to articulate along the z-axis to adjust the grating focus on the sample plane. Semi-reflective mirror 280 may be a dichroic mirror to reflect structured illumination light received from each arm down into objective 270 for projection onto sample 271, and to pass through light emitted by sample 271 (e.g., fluorescent light, which is emitted at different wavelengths than the excitation) onto camera 290.

It is worth noting that the example of system 200 may provide a high optical efficiency due to the absence of a polarizer. Additionally, the use of unpolarized light may not have a significant impact on pattern contrast depending on the numerical aperture setting of the objective 270.

It should be noted that, for the sake of simplicity, optical components of SIM imaging system 200 may have been omitted from the foregoing discussion. Additionally, although system 200 is illustrated in this example as a single channel system, in other implementations, it may be implemented as a multi-channel system (e.g., by using two different cameras and light sources that emit in two different wavelengths).

Figure 3:
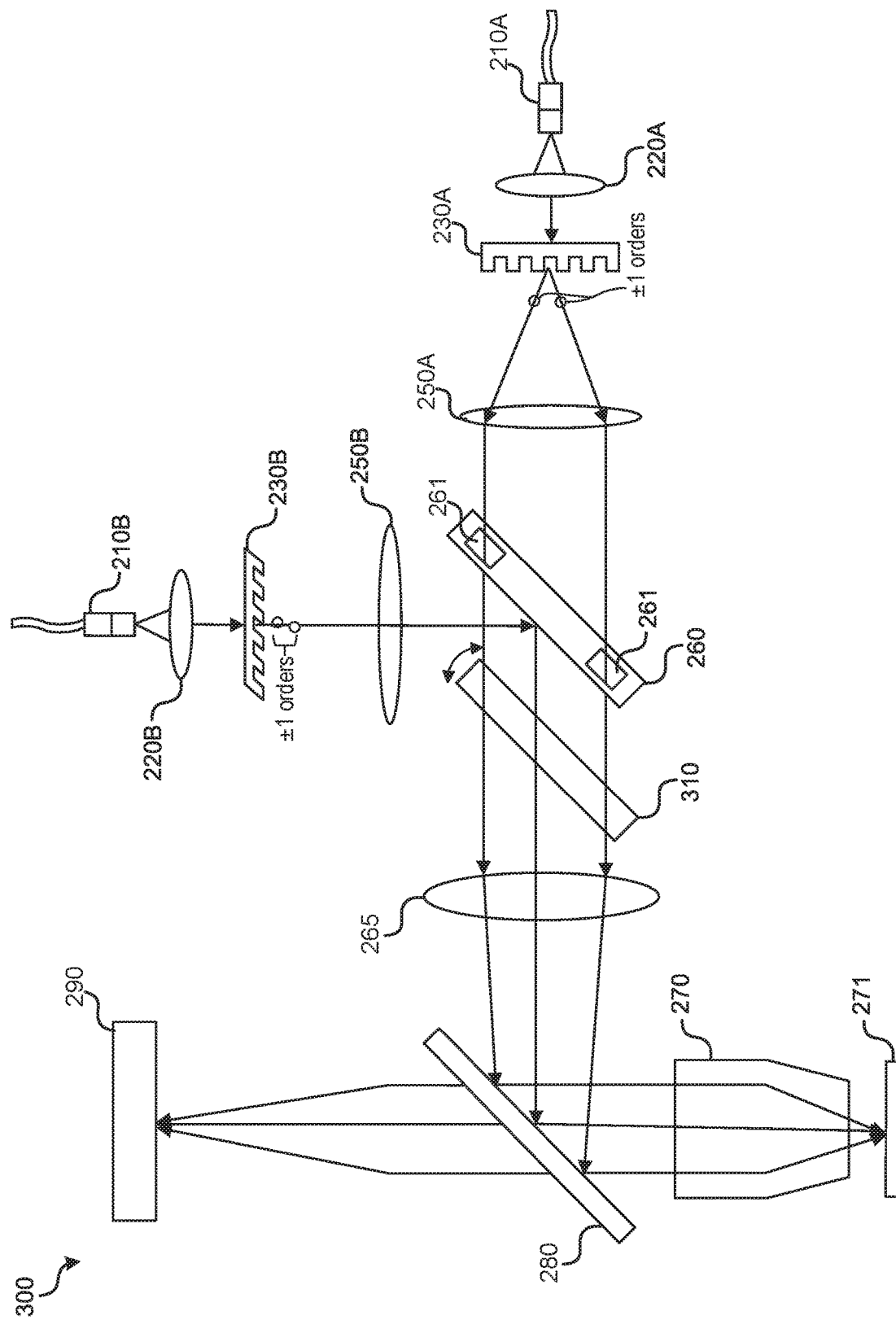
FIG. 3 is an optical diagram illustrating another example optical configuration of a two-arm SIM imaging system, in accordance with some implementations described herein.

FIG. 3 is an optical diagram illustrating another example optical configuration of a two-arm SIM imaging system 300 in accordance with some implementations described herein. In system 300, a large, rotating optical window 310 may be placed after mirror 260 with holes 261. In this case, window 310 may be used in place of windows 240A and 240B to modulate the phases of both sets of diffracted beams output by the vertical and horizontal diffraction gratings. Instead of being parallel with respect to the optical axis of one of the gratings, the axis of rotation for the rotating window 310 may be offset 45 degrees (or some other angular offset) from the optical axis of each of the vertical and horizontal gratings to allow for phase shifting along both directions along one common axis of rotation of window 310. In some implementations, the rotating window 310 may be replaced by a wedged optic rotating about the nominal beam axis.

Figure 4:
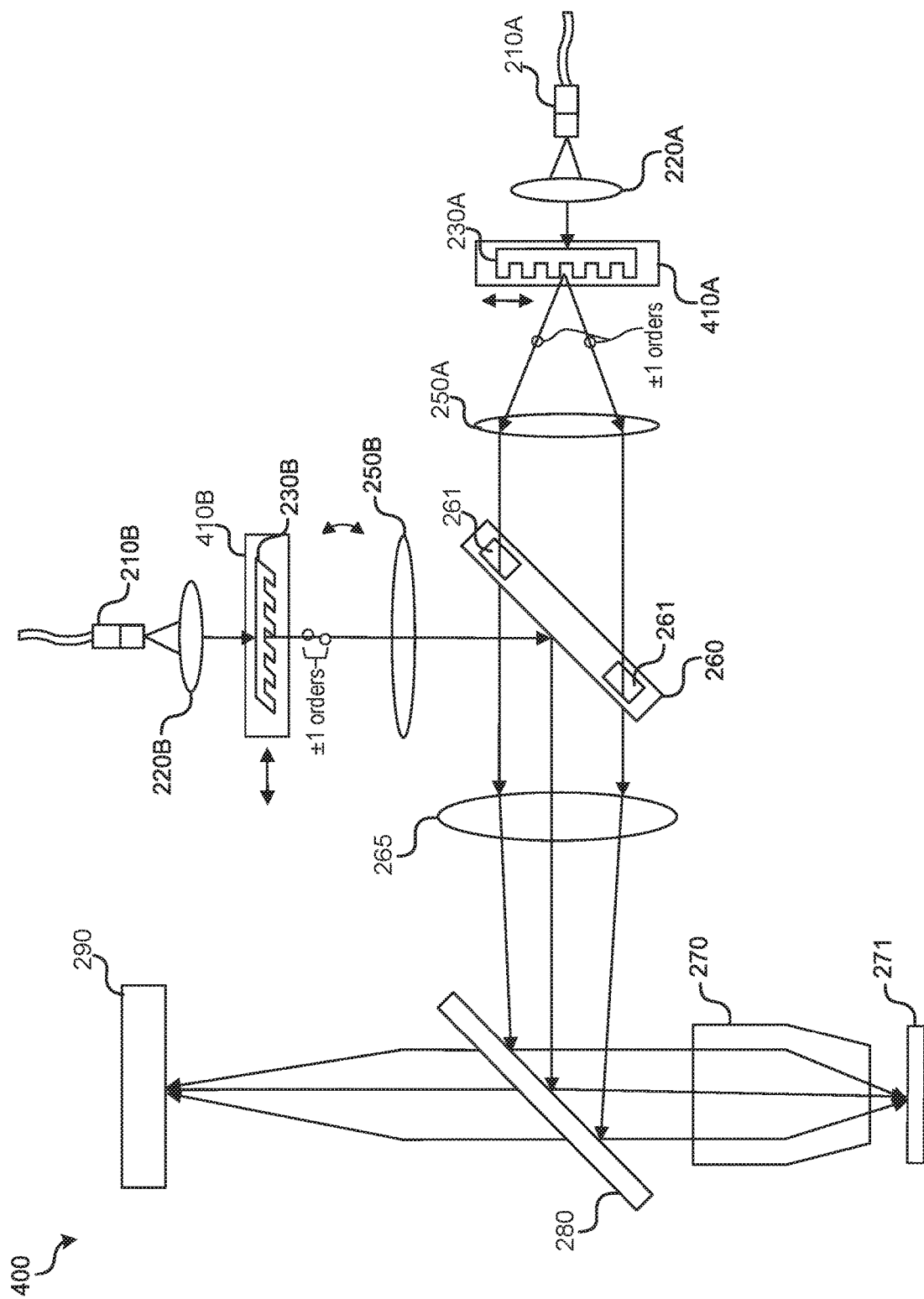
FIG. 4 is an optical diagram illustrating another example optical configuration of a two-arm SIM imaging system, in accordance with some implementations described herein.

FIG. 4 is an optical diagram illustrating another example optical configuration of a two-arm SIM imaging system 400 in accordance with some implementations described herein. In system 400, gratings 230A and 230B are mounted on respective linear motion stages 410A and 410B that may be translated to change the optical path length (and thus the phase) of light emitted by gratings 230A and 230B. The axis of motion of linear motion stages 410A-410B may be perpendicular or otherwise offset from the orientation of their respective grating to realize translation of the grating's pattern along a sample 271. In implementations, stages 410A and 410B may each utilize crossed roller bearings, a linear motor, a high-accuracy linear encoder, and/or other technologies to provide precise linear translations of the gratings to phase shift the projected images.

Figure 5:
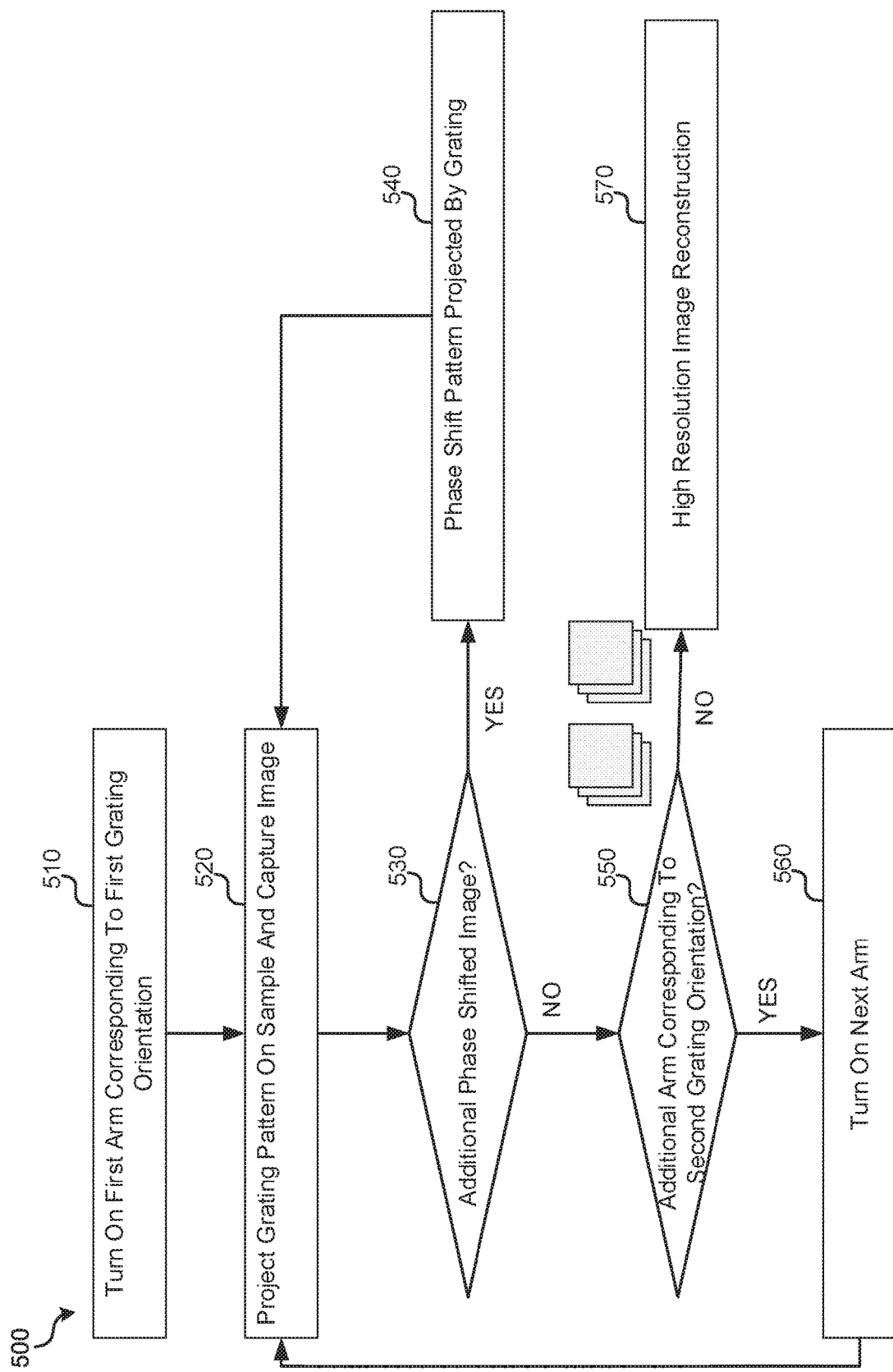
FIG. 5 is an operational flow diagram illustrating an example method that may be performed by a multi-arm SIM imaging system during one imaging cycle to use structured light to create a high resolution image, in accordance with some implementations described herein.

FIG. 5 is an operational flow diagram illustrating an example method 500 that may be performed by a multi-arm SIM imaging system during one imaging cycle to use structured light to create a high-resolution image in accordance with some implementations described herein. In implementations, method 500 may be performed to image an entire sample or a location of a larger sample. Method 500 will be described in conjunction with FIG. 6, which illustrates simplified illumination fringe patterns that may be projected onto the plane of a sample 271 by a vertical grating and horizontal grating of a two-arm SIM imaging system during image capture. For example, SIM imaging system 200 may use vertical grating 230A and horizontal grating 230B to generate the horizontal and vertical illumination patterns shown in FIG. 6, while phase modulators 230A and 230B may be set to three different positions to produce the three phase shifts shown.

At operation 510, a first arm corresponding to a first grating orientation is turned on to begin generating illumination patterns using the first arm. For instance, in the implementation of imaging system 200, a high-speed shutter positioned in the path between optical fiber 210A and a light source may be opened or otherwise actuated such that the light source is not blocked. Alternatively, one or more light sources may be turned on or off (e.g., pulsed), or an optical switch may be used to direct a light source through the optical path of the first arm (e.g., through one of the first or second emitter). In some instances, operation 510 may also include turning on the light source (e.g., in the case of the first imaging cycle).

Figure 6:
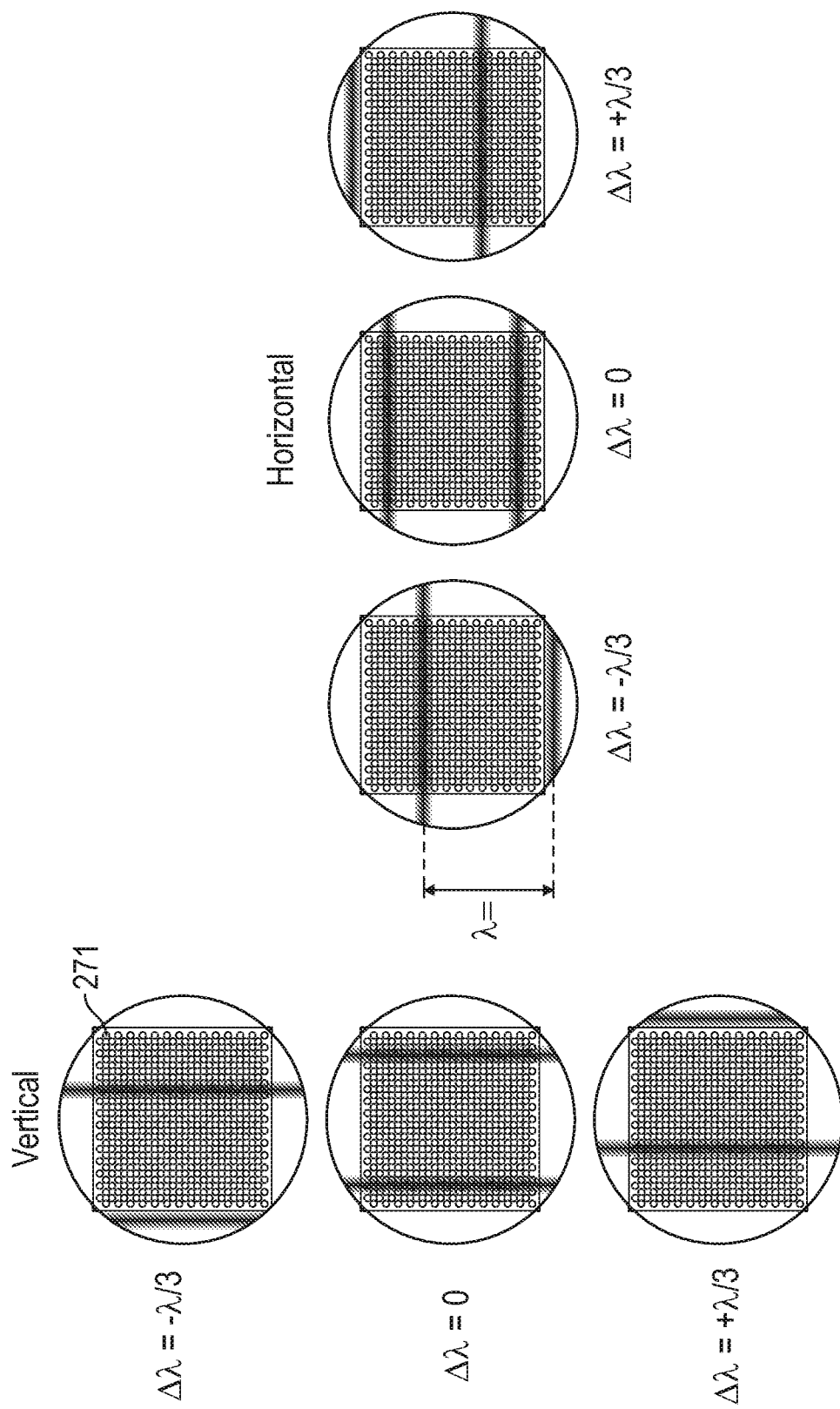
FIG. 6 illustrates simplified illumination fringe patterns that may be projected onto the plane of a sample by a vertical grating and horizontal grating of a two-arm SIM imaging system during image capture, in accordance with some implementations described herein.

Once the first arm is turned on, at operation 520 a first grating pattern may be projected on the sample and an image may be captured. For example, as illustrated by FIG. 6, vertical grating 230A may project first-order illumination fringes on sample 271. Any light emitted by the sample may be captured by camera 290 and a first phase image of the first pattern (e.g., vertical pattern) may be captured. For instance, fluorescent dyes situated at different features of the sample 271 may fluoresce and the resultant light may be collected by the objective lens 270 and directed to an image sensor of camera 290 to detect the florescence.

If additional phase shifted images need to be captured (decision 530), at operation 540 the pattern projected by the grating may be phase shifted to capture the next phase image of the pattern. For example, in the implementation of system 200, the phase of the pattern projected by vertical grating 230A may be phase shifted by rotating optical window 240A. Alternatively, other optical phase modulators such as translation stages or rotating optical wedges may be used to shift the phase. For instance, as illustrated in the example of FIG. 6, the phase may be shifted by ⅓ of the pitch (λ) of the fringe pattern such that the pattern projected on the sample is offset by ⅓λ from the prior image that was captured. In some implementations, the pattern projected by the grating may be phase shifted by moving the sample (e.g., using a motion stage) while the projected fringes remain stationary. In some implementations, the pattern projected by the grating may be phase shifted by moving both the sample and the projected fringes. Operations 520-540 may iterate until all phase images of a first pattern are captured (e.g., three phase-shifted images of the vertical pattern in the case of FIG. 6).

Once all phase images of a pattern have been captured, at operation 560 the second arm corresponding to a second grating orientation of the SIM imaging system may be turned on. For instance, in the implementation of imaging system 200, a high-speed shutter positioned in the path between optical fiber 210B and a light source may be opened or otherwise actuated such that the light source is not blocked. Alternatively, one or more light sources may be turned on or off (e.g., pulsed), or an optical switch may be used to direct a light source through the optical path of the second arm. Additionally, the other arm may be turned off. A series of phase images may then be captured for the next arm by repeating operations 520-540. For instance, as illustrated by FIG. 6, horizontal grating 230B may project first-order illumination fringes on sample 271, and the projected fringes may be shifted in position by ⅓λ to capture three phase images of the horizontal pattern. As another example, the pattern projected by the grating may be phase shifted by moving the sample (e.g., using a motion stage) while the projected fringes remain stationary, or by moving both the sample and the projected fringes.

Once all images have been captured for the imaging cycle, at operation 570, a high resolution image may be constructed from the captured images. For example, a high resolution image may be reconstructed from the six images shown in FIG. 6. Suitable algorithms may be used to combine these various images to synthesize a single image of the sample with significantly better spatial resolution than any of the individual component images.

It should be noted that although method 500 has been primarily described in the context of single channel imaging (e.g., imaging a sample using a light source having a single wavelength), in some implementations method 500 may be adapted for multi-channel imaging (e.g., imaging a sample using light sources having different wavelengths). In such implementations, method 500 may be repeated for each channel of the imaging system (e.g., sequentially, or in parallel) to generate high resolution images for each channel.

Although implementations of the two-arm SIM imaging system 200 described herein have so far been described in the context of system 200 that utilizes a mirror 260 with holes 261 to losslessly combine the optical paths of the two arms, in an alternative implementation, the two images of the horizontal and vertical gratings 230A-230B may be losslessly combined by using a polarizing beam splitter in place of the mirror with holes and to illuminate the vertical grating with vertically-polarized light and the horizontal grating with horizontally-polarized light. In such implementations, the structured illumination pattern can be switched from horizontal to vertical by turning the corresponding polarized illumination sources on and off.

Figure 7:
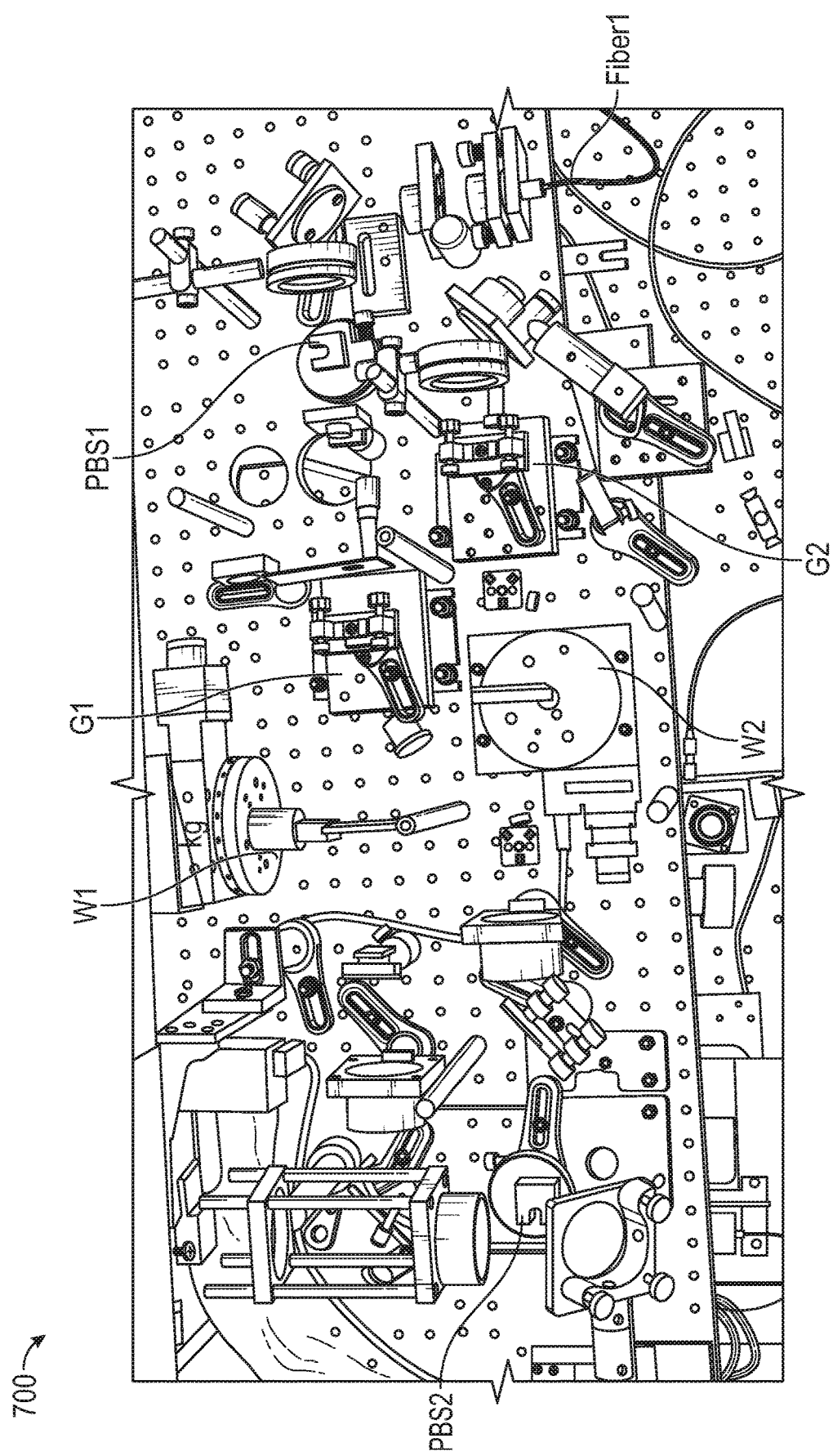
FIG. 7 illustrates an example experimental design of a two-arm SIM imaging system that uses a polarizing beam splitter to illuminate a vertical grating with vertically-polarized light and a horizontal grating with horizontally-polarized light, in accordance with some implementations described herein.

By way of example, FIG. 7 illustrates an example experimental design of a two-arm SIM imaging system 700 that uses a polarizing beam splitter to combine the optical paths of the arms, and that illuminates a vertical grating with vertically-polarized light and a horizontal grating with horizontally-polarized light. In the implementation of FIG. 7, the horizontal and vertical gratings are G1 and G2, the horizontal and vertical rotating windows are W1 and W2, and the polarizing beam splitter for combining the horizontal and vertical grating images is PBS2. The output of a fiber-coupled mode-scrambled multi-mode laser is Fiber1.

Figure 8A:
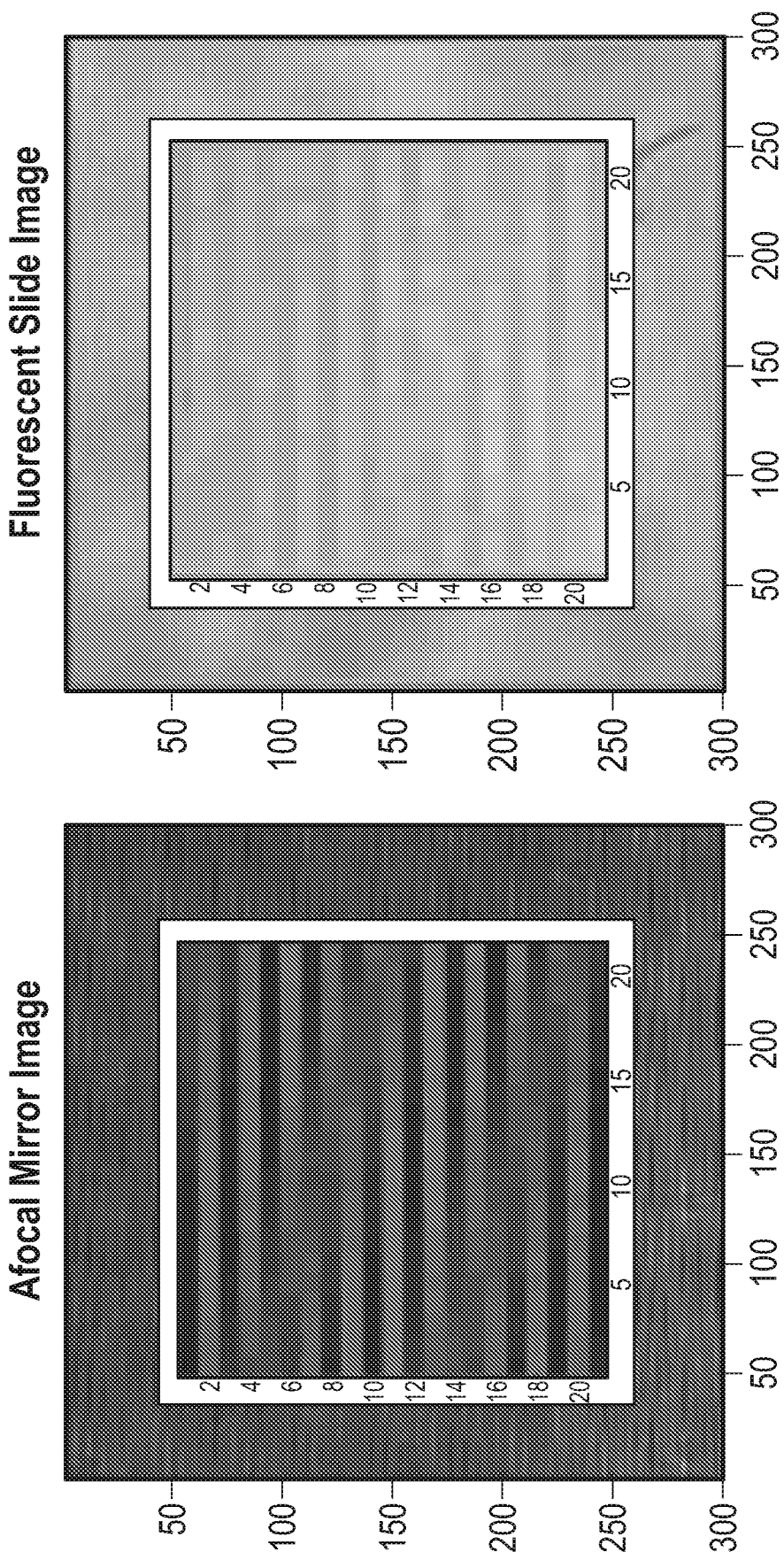
FIG. 8A illustrates an afocal mirror image and fluorescent slide captured using the example SIM imaging system of FIG. 7, using a 20×/0.75 NA microscope.

FIG. 8A illustrates an afocal mirror image and fluorescent slide captured using example SIM imaging system 700, using a 20×/0.75 NA microscope. The afocal mirror image has fringe visibility of 84%. The fluorescent slide image has fringe visibility of 6.6%.

Figure 8B:
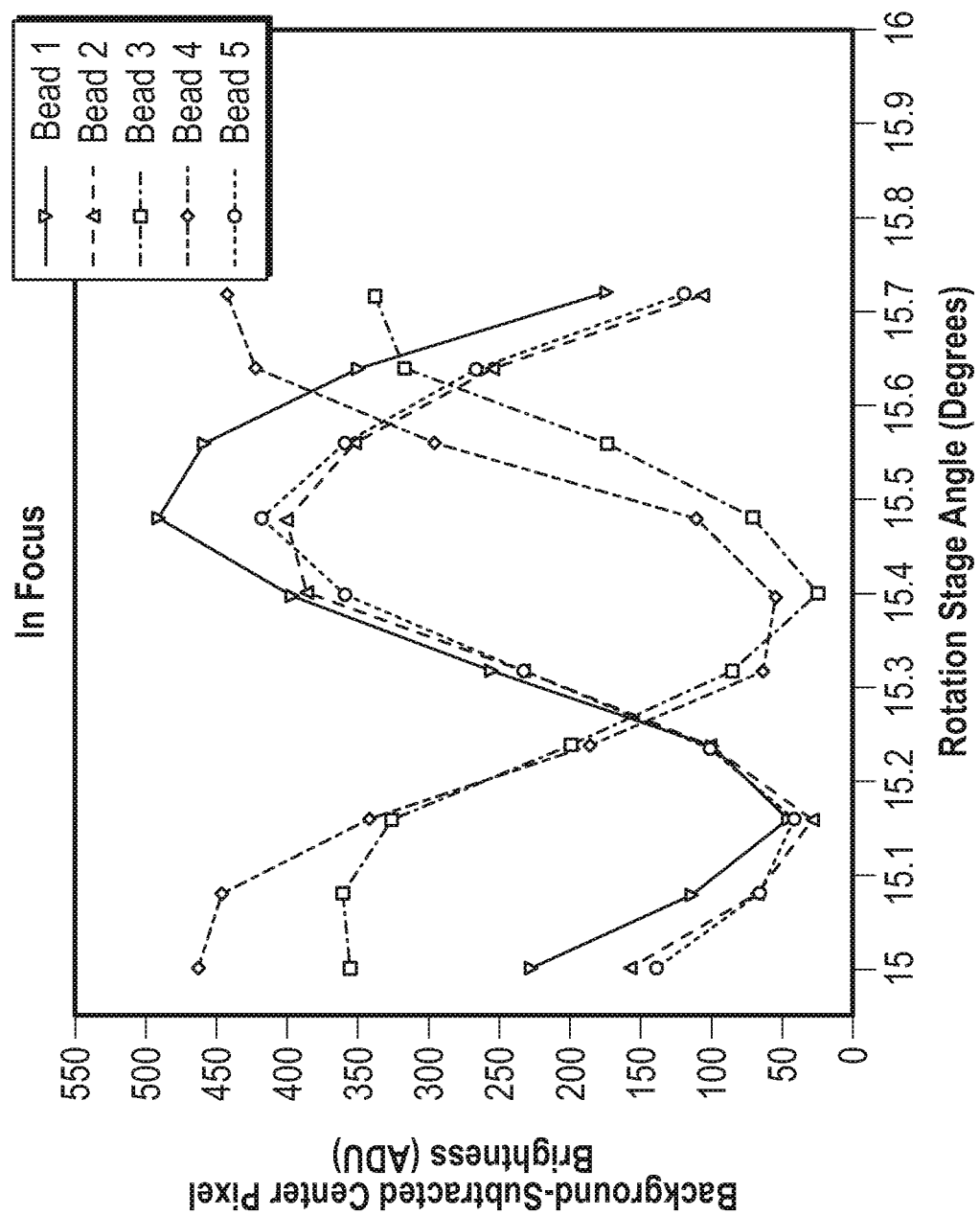
FIG. 8B illustrates fringe modulation measurements acquired using the system of FIG. 7 with a beaded flowcell. The graph illustrates typical feature image intensity changes during a phase adjustment cycle in this example, as the angle of parallel plate W2 of FIG. 7 is changed.

FIG. 8B illustrates fringe modulation measurements acquired using system 700 with a beaded flowcell. The graph illustrates typical feature image intensity changes during a phase adjustment cycle, as the angle of parallel plate W2 of FIG. 7 is changed.

Figure 9:
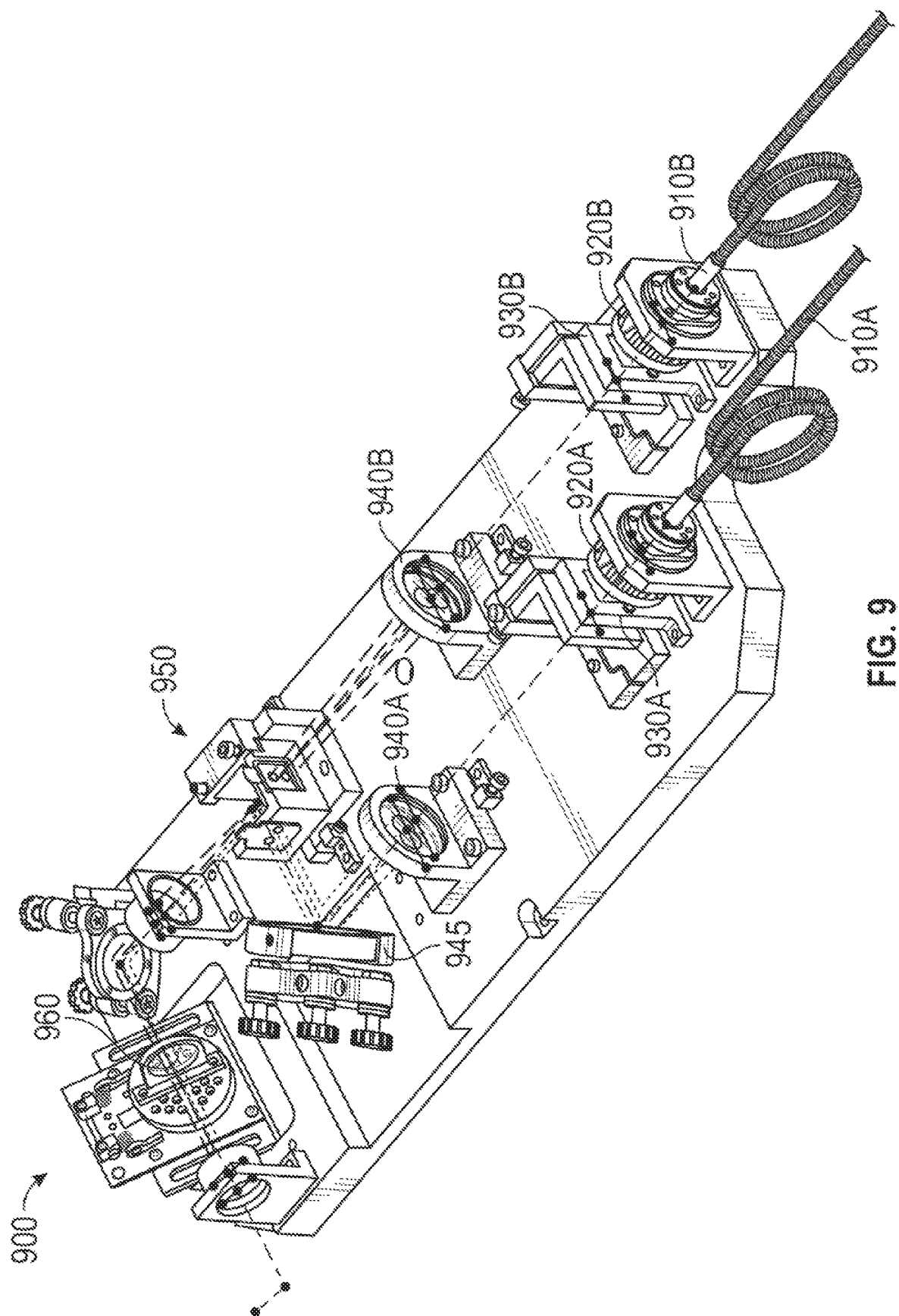
FIG. 9 illustrates another example optical configuration of a two-arm SIM imaging system in accordance with some implementations described herein.

FIG. 9 illustrates another example optical configuration of a two-arm SIM imaging system 900 in accordance with some implementations described herein. The first arm of system 900 includes a light emitter 910A (e.g., optical fiber), an optical collimator 920A to collimate light output by light emitter 910A, a diffraction grating 930A in a first orientation with respect to the optical axis, and a relay lens 940A. The second arm of system 900 includes a light emitter 910B, an optical collimator 920B to collimate light output by light emitter 910B, a diffraction grating 930B in a second orientation with respect to the optical axis, and a relay lens 940B.

System 900 also includes a beam combining element 950 for combining the two arms of the optical system. As illustrated, beam combining element 950 includes a 45° prism with holes to pass through structured light from the second arm of the system and a mirrored surface for reflecting structured light received from the first arm. Before entering beam combining element 950, each structured beam of light passes through a spatial filter having a pair of apertures to pass the ±1 orders and block other orders. Structured light emanating from the first arm in a first plane may be directed by reflective optic 945 into beam combining element 950. In system 900, parallel plate optical element 960 serves as a phase adjuster and may be rotated to shift structured light in either orientation after beam combining element 950.

Although implementations described herein have so far been described in the context of a two-arm structured illumination imaging system that includes two gratings oriented at two different angles, it should be noted that in other implementations, systems with more than two arms may be implemented. In the case of a regularly patterned sample with features on a rectangular grid, resolution enhancement can be achieved with only two perpendicular angles (e.g., vertical grating and horizontal grating) as described above. On the other hand, for image resolution enhancement in all directions for other samples (e.g., hexagonally patterned samples), three grating angles may be used. For example, a three-arm system may include three light emitters and three fixed diffraction gratings (one per arm), where each diffraction grating is oriented around the optical axis of the system to project a respective pattern orientation on the sample (e.g., a 0° pattern, a 120° pattern, or a 240° pattern). In such systems, additional mirrors with holes may be used to combine the additional images of the additional gratings into the system in a lossless manner. Alternatively, such systems may utilize one or more polarizing beam splitters to combine the images of each of the gratings.

Multiple Optical Grating Slide Structured Illumination Microscopy Imaging System In accordance with some implementations of the technology disclosed herein, the SIM imaging system may be implemented as a multiple optical grating slide SIM imaging system, where one linear motion stage is mounted with a plurality of diffraction gratings (or other beam splitting optical elements) having a corresponding, fixed orientation with respect to the optical axis of the system.

Figure 10A:
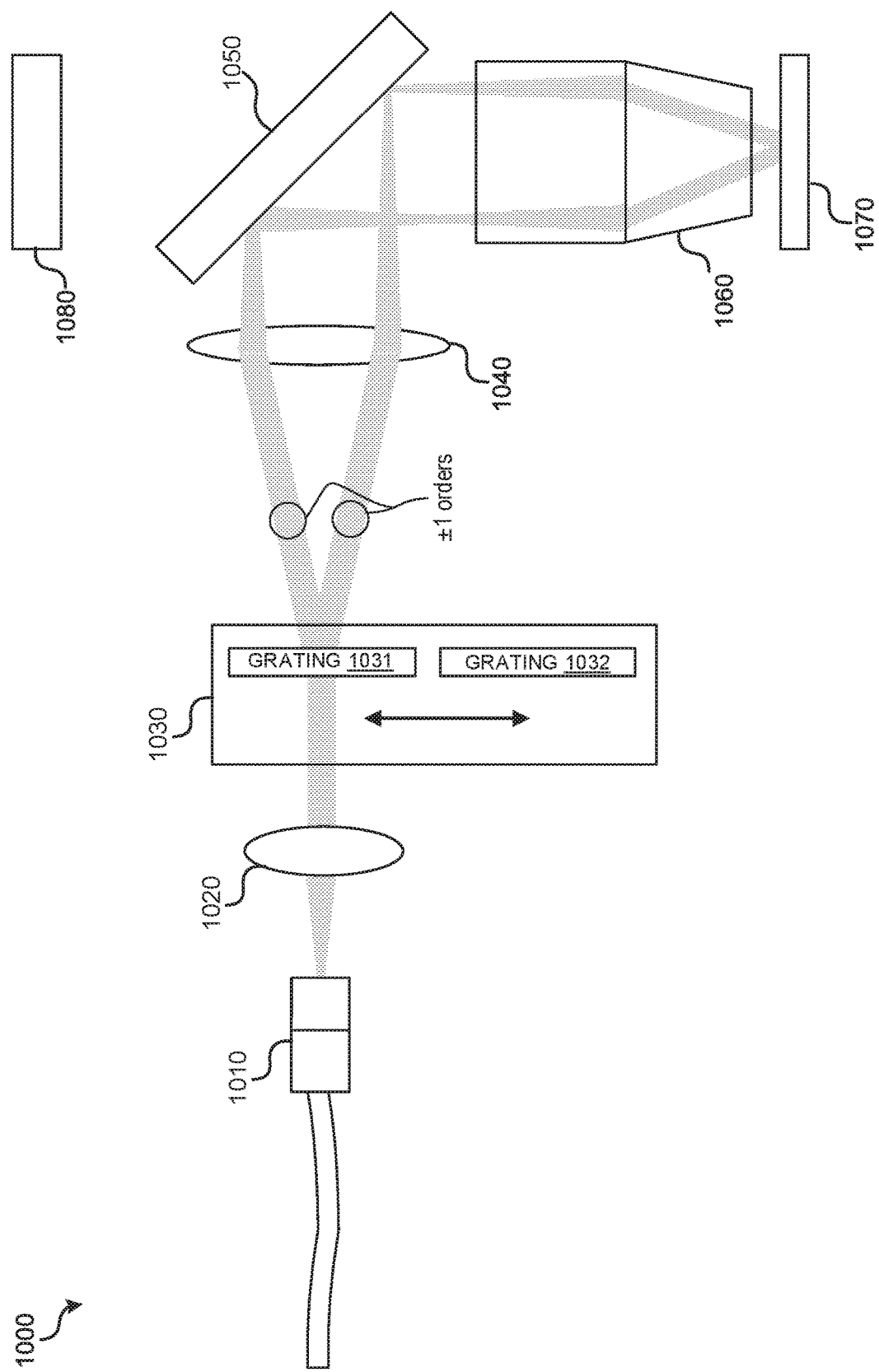
FIG. 10A is a schematic diagram illustrating an example optical configuration of a dual optical grating slide SIM imaging system in a first diffraction grating position, in accordance with some implementations described herein.
Figure 10B:
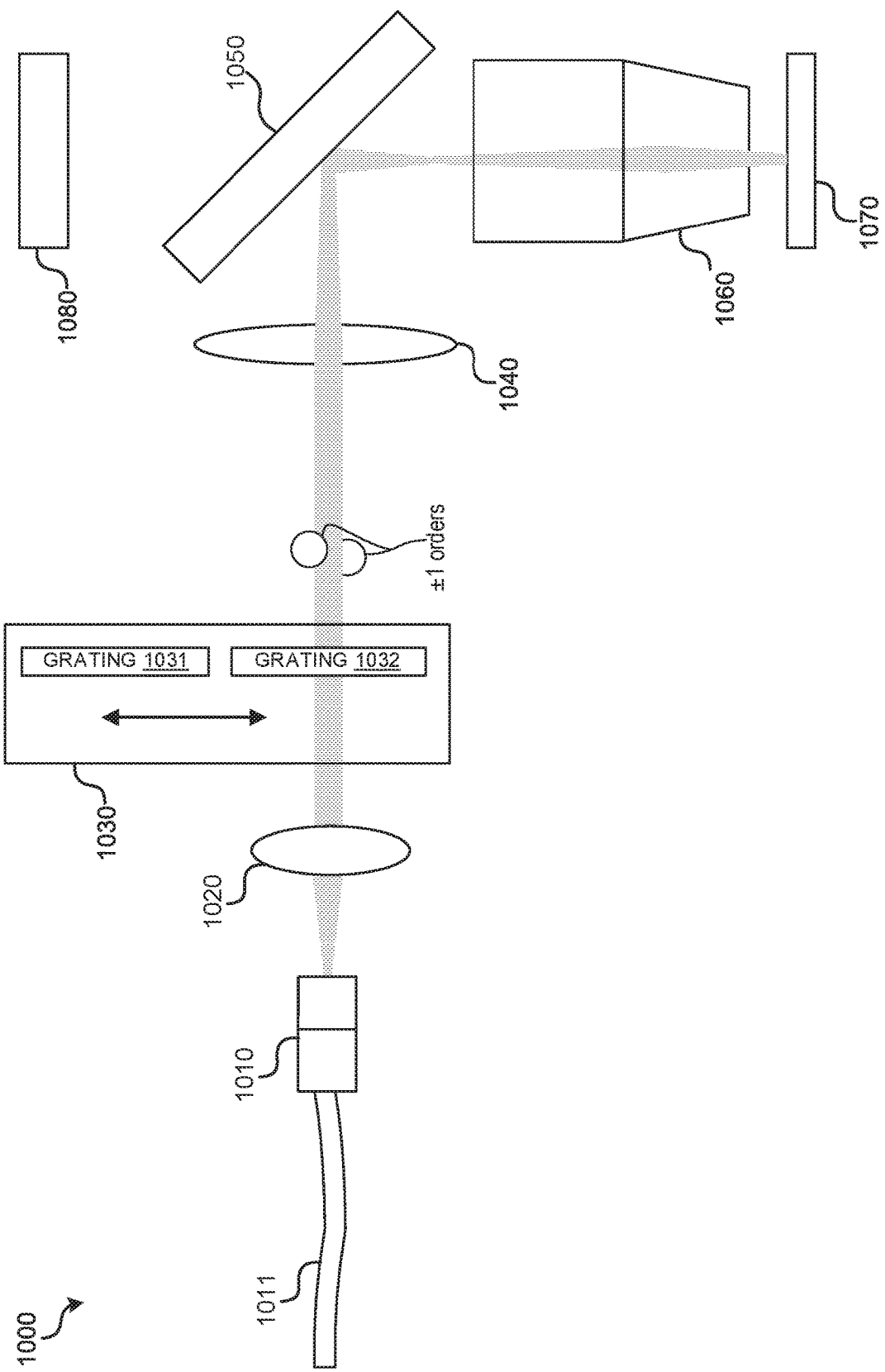
FIG. 10B is a schematic diagram illustrating an example optical configuration of the dual optical grating slide SIM imaging system of FIG. 10A in a second diffraction grating position, in accordance with some implementations described herein.

FIGS. 10A-10B are schematic diagrams illustrating an example optical configuration of a dual optical grating slide SIM imaging system 1000 in accordance with some implementations described herein. As further described below, in the configuration of system 1000 all changes to the grating pattern projected on sample 1070 (e.g., pattern phase shifts or rotations) may be made by linearly translating a motion stage 1030 along a single axis of motion, to select a grating 1031 or 1032 (i.e., select grating orientation) or to phase shift one of gratings 1031-1032.

System 1000 includes a light emitter 1010 (e.g., optical fiber optically coupled to a light source), a first optical collimator 1020 (e.g., collimation lens) to collimate light output by light emitter 1010, a linear motion stage 1030 mounted with a first diffraction grating 1031 (e.g., horizontal grating) and a second diffraction grating 1032 (e.g. vertical grating), a projection lens 1040, a semi-reflective mirror 1050 (e.g., dichroic mirror), an objective 1060, a sample 1070, and a camera 1080. For simplicity, optical components of SIM imaging system 1000 may be omitted from FIG. 10A. Additionally, although system 1000 is illustrated in this example as a single channel system, in other implementations, it may be implemented as a multi-channel system (e.g., by using two different cameras and light sources that emit in two different wavelengths).

As illustrated by FIG. 10A, a grating 1031 (e.g., a horizontal diffraction grating) may diffract a collimated light beam into first order diffracted light beams (on the plane of the page). As illustrated by FIG. 10B, a diffraction grating 1032 (e.g., a vertical diffraction grating) may diffract a beam into first orders (above and below the plane of the page). In this configuration only a single optical arm having a single emitter 1010 (e.g., optical fiber) and single linear motion stage is needed to image a sample 1070, which may provide system advantages such as reducing the number of moving system parts to improve speed, complexity and cost. Additionally, in system 1000, the absence of a polarizer may provide the previously mentioned advantage of high optical efficiency. The configuration of example SIM imaging system 200 may be particularly advantageous in the case of a regularly patterned sample 1070 with features on a rectangular grid, as structured resolution enhancement can be achieved using only two perpendicular gratings (e.g., vertical grating and horizontal grating).

To improve efficiency of the system, the zeroth order beams and all other higher order diffraction beams (i.e., ±2 orders or higher) output by each grating may be blocked (i.e., filtered out of the illumination pattern projected on the sample 1070). For example, a beam blocking element (not shown) such as an order filter may be inserted into the optical path after motion stage 1030. In some implementations, diffraction gratings 1031-1032 may configured to diffract the beams into only the first orders and the 0-order (undiffracted beam) may be blocked by some beam blocking element.

In the example of system 1000, the two gratings may be arranged about ±45° from the axis of motion (or other some other angular offset from the axis of motion such as about +40°/−50°, about +30°/−60°, etc.) such that a phase shift may be realized for each grating 1031-1032 along a single axis of linear motion. In some implementations, the two gratings may be combined into one physical optical element. For example, one side of the physical optical element may have a grating pattern in a first orientation, and an adjacent side of the physical optical element may have a grating pattern in a second orientation orthogonal to the first orientation.

Single axis linear motion stage 1030 may include one or more actuators to allow it to move along the X-axis relative to the sample plane, or along the Y-axis relative to the sample plane. During operation, linear motion stage 1030 may provide sufficient travel (e.g., about 12-15 mm) and accuracy (e.g., about less than 0.5 micrometer repeatability) to cause accurate illumination patterns to be projected for efficient image reconstruction. In implementations where motion stage 1030 is utilized in an automated imaging system such as a fluorescence microscope, it may be configured to provide a high speed of operation, minimal vibration generation and a long working lifetime. In implementations, linear motion stage 1030 may include crossed roller bearings, a linear motor, a high-accuracy linear encoder, and/or other components. For example, motion stage 1030 may be implemented as a high-precision stepper or piezo motion stage that may be translated using a controller.

Figure 11:
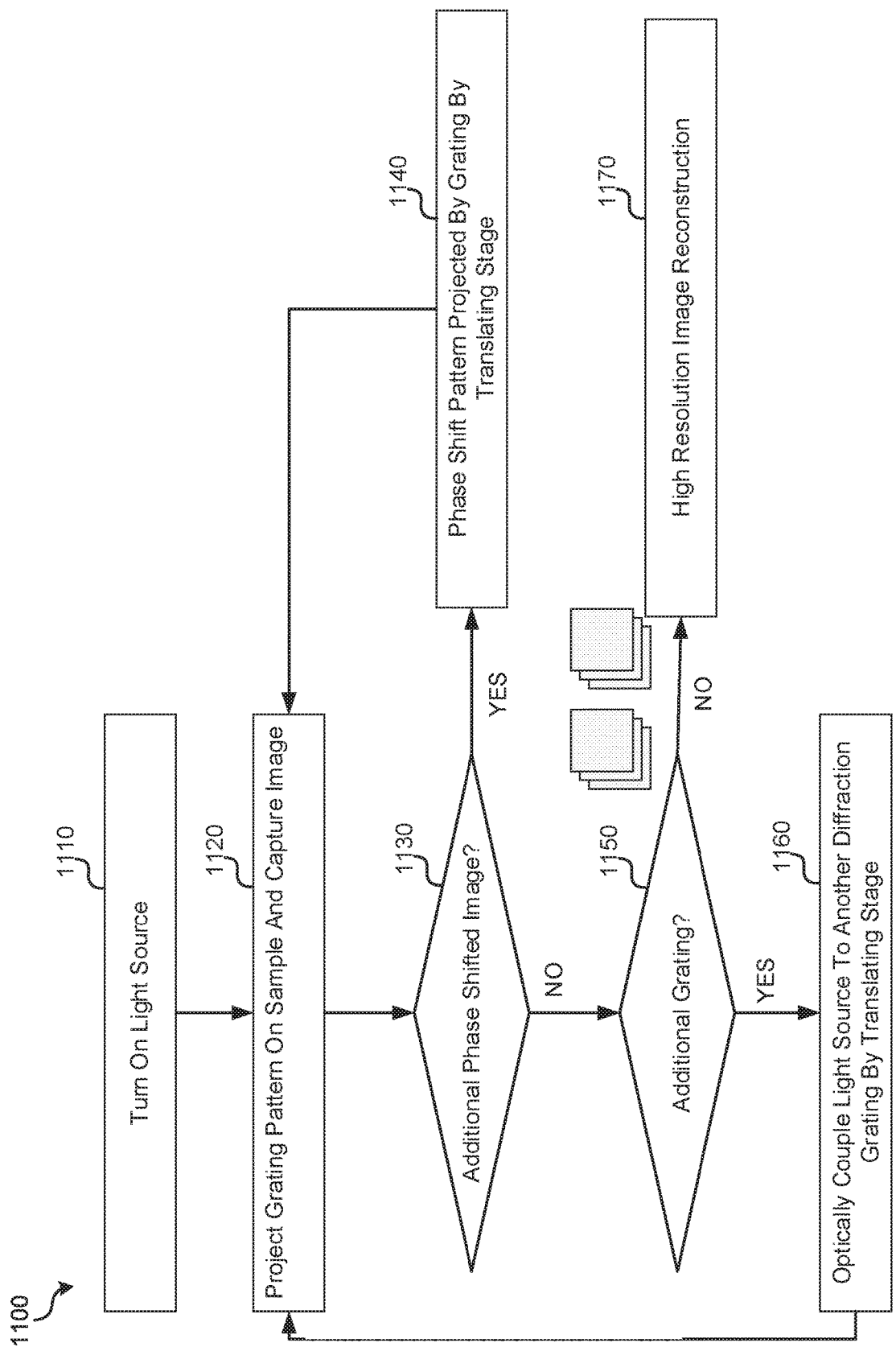
FIG. 11 is an operational flow diagram illustrating an example method that may be performed by a multiple optical grating slide SIM imaging system during one imaging cycle to use structured light to create a high resolution image, in accordance with some implementations described herein.
Figure 12:
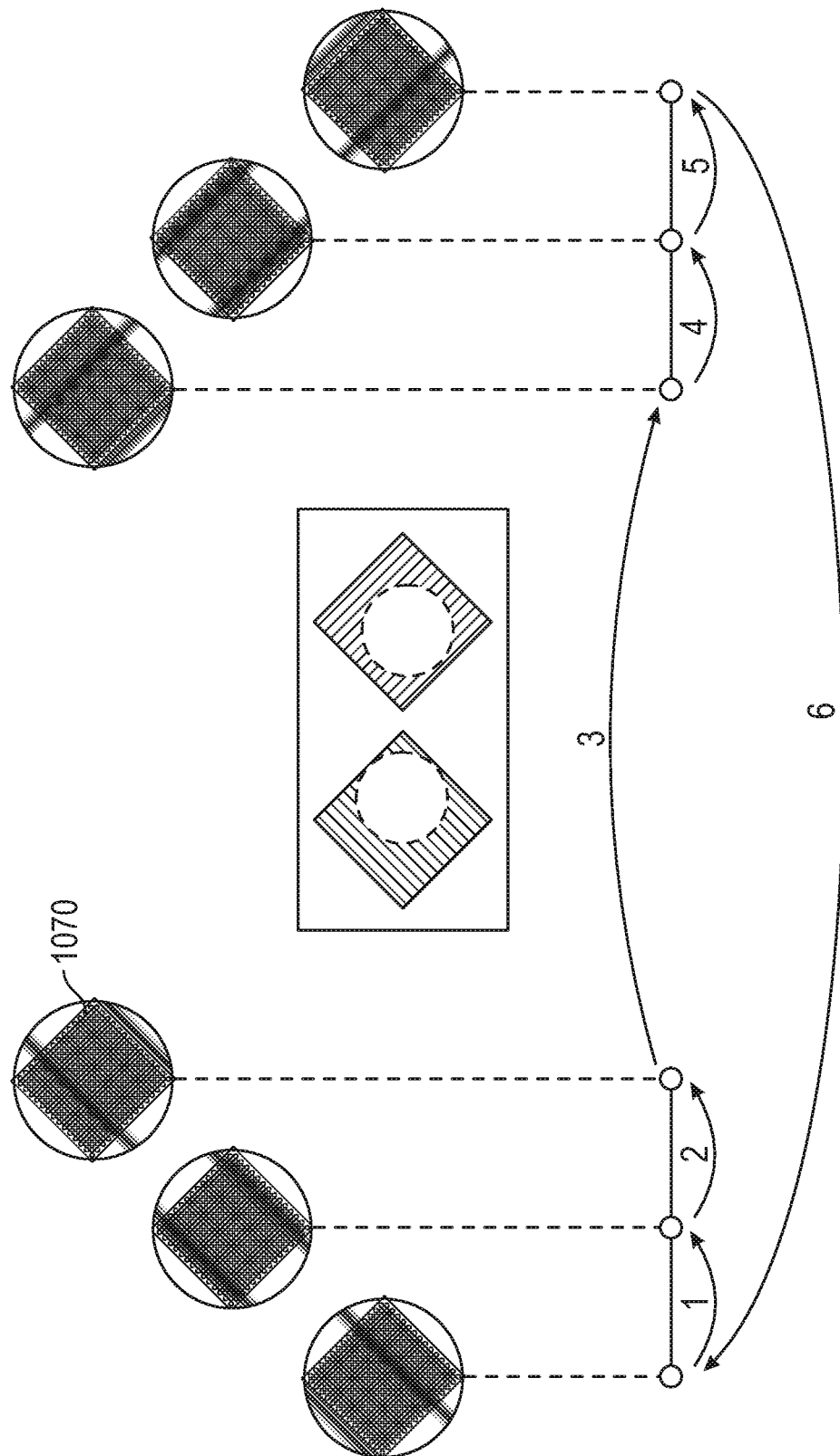
FIG. 12 illustrates simplified illumination fringe patterns that may be projected onto the plane of a sample by a first diffraction grating and a second diffraction grating of a dual optical grating slide SIM imaging system during image capture, in accordance with some implementations described herein.

FIG. 11 is an operational flow diagram illustrating an example method 1100 that may be performed by a multiple optical grating slide SIM imaging system during one imaging cycle to use structured light to create a high resolution image in accordance with some implementations described herein. Depending on the implementation, method 1100 may be performed to image an entire sample or a location of a larger sample. Method 1100 will be described in conjunction with FIG. 12, which illustrates simplified illumination fringe patterns that may be projected onto the plane of a sample 1070 by a first diffraction grating and a second diffraction grating of a dual optical grating slide SIM imaging system during image capture. For example, a SIM imaging system 1000 may use a first diffraction grating 1031 and second diffraction grating 1032 to generate the illumination patterns shown in FIG. 12. As illustrated in the example of FIG. 12, the two gratings project perpendicular fringe patterns on the surface of sample 1070 and are arranged about ±45° from the axis of motion of linear motion stage 1030.

At operation 1110, the light source is turned on. For example, an optical shutter may be actuated to optically couple the optical fiber of light emitter 1010 to a light source. As another example, a light source may be pulsed or an optical switch may be used to direct a light source through the optical path of the light emitter. At operation 1120, a first grating pattern may be projected on the sample and an image may be captured. For example, as illustrated by FIG. 12, a first grating (e.g., grating 1031), may project first-order illumination fringes on sample 1070. Any light emitted by the sample may be captured by camera 1080 and a first phase image of the first pattern (e.g., +45° pattern) may be captured. For instance, fluorescent dyes situated at different features of the sample 1070 may fluoresce and the resultant light may be collected by the objective lens 1060 and directed to an image sensor of camera 1080 to detect the florescence.

To capture additional phase shifted images, at operation 1140 the pattern projected by the grating may be phase shifted by translating the linear motion stage. In the example of FIG. 12, these phase shift motions are illustrated as steps 1 and 2. The phase shift motions may provide small (e.g., about 3 to 5 micrometers or smaller) moves of the gratings to slightly shift the fringe pattern projected on the grating.

By way of particular example, consider the case where the pitch λ of the fringe at the sample of FIG. 11 is 2100 nm. In this case, three phase shifted images are captured in the sample, requiring phase shifts of the projected fringes of λ/3, or 700 nm. Assuming an objective illumination magnification of 10×, the phase shift steps (linear translations) required of the single axis linear motion stage may be calculated as 700 nm*10*sqrt(2), or about 9.9 μm. In this case, the sqrt(2) factor accounts for the 45 degree offset between the orientation of the grating and the axis of motion of the motion stage, More generally, the translation distance of the linear motion stage during each phase shift step in this example configuration may be described by $\lambda/3 \times MAG \times \sqrt{2}$ where MAG is the illumination magnification.

Following capture of all phase shifted images for a diffraction grating (decision 1130), at operation 1160 the system may switch diffraction gratings by translating the linear motion stage to optically couple another diffraction grating to the light source of the imaging system (e.g., transition from FIG. 10A to FIG. 10B). This motion is illustrated as step 3 in the example of FIG. 12. In the case of diffraction grating changes, the linear motion stage may provide a relatively large translation (e.g., on the order of 12-15 mm).

A series of phase images may then be captured for the next grating by repeating operations 1120-1140. For instance, as illustrated by FIG. 12, a second diffraction grating may project first-order illumination fringes on sample 271, and the projected fringes may be shifted in position by λ/3 by translating the linear motion stage to capture three phase images of the grating's pattern (e.g., steps 4 and 5 of FIG. 12).

Once all images have been captured for the imaging cycle, at operation 1170, a high resolution image may be constructed from the captured images. For example, a high resolution image may be reconstructed from the six images shown schematically in FIG. 12. As the foregoing example illustrates, a multiple optical grating slide SIM imaging system advantageously may switch between fringe angles and phases with a single linear actuator, thereby saving on cost and complexity of the structured illumination imaging system.

Figure 13:
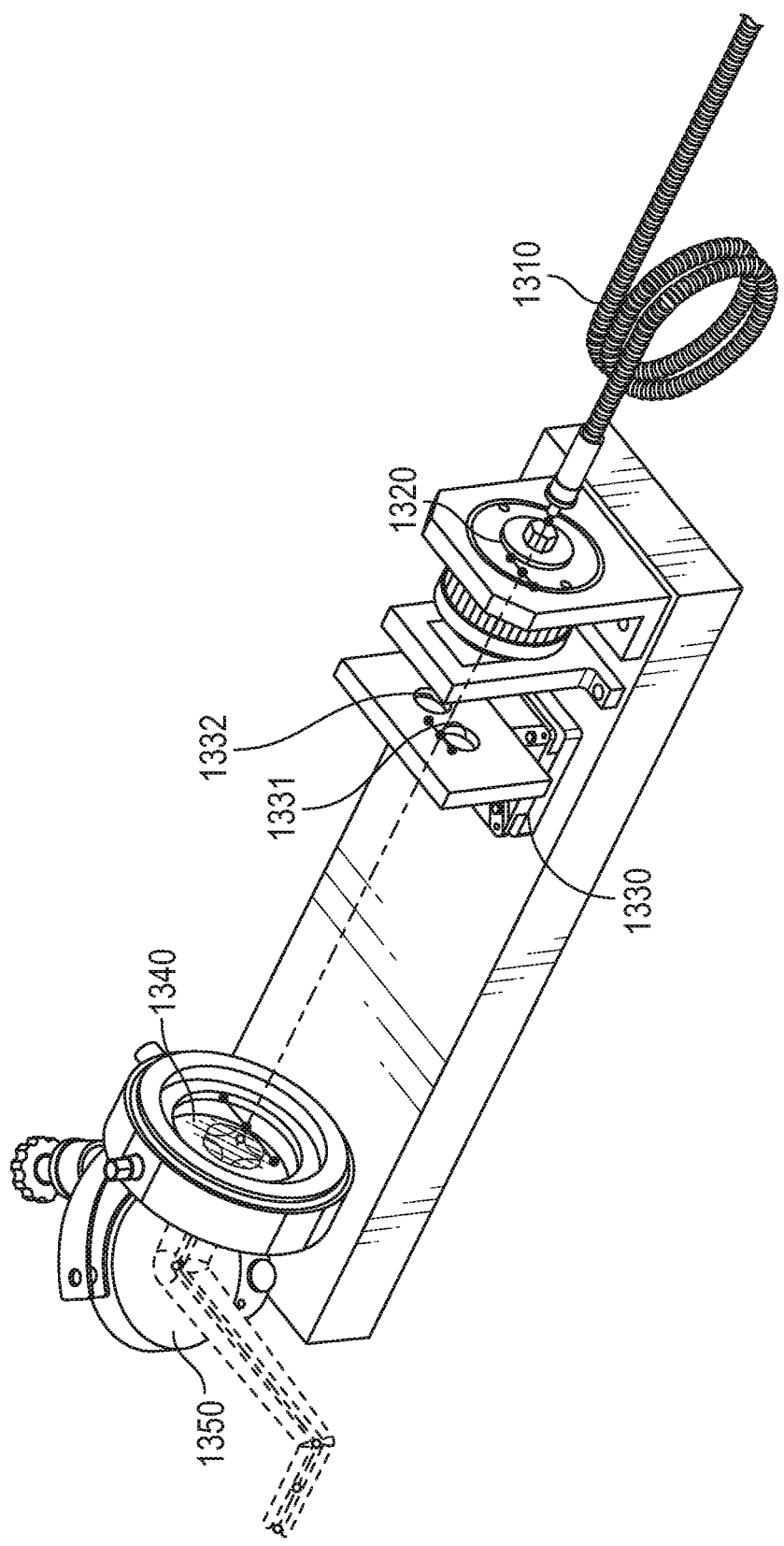
FIG. 13 is a diagram illustrating an example dual optical grating slide SIM imaging configuration in accordance with some implementations described herein.

FIG. 13 is a diagram illustrating an example dual optical grating slide SIM imaging configuration 1300. As illustrated, the configuration 1300 may include an optical fiber 1310 to emit light, a collimator 1320, a linear motion stage 1330 mounted with first and second diffraction gratings 1331-1332, a projection lens 1340, and a turning mirror 1350. In this example, gratings 1331-1332 are embedded in the same object, adjacent to each other along the axis of motion of stage 1330. Other components not shown may be similar to those in FIG. 10A, such as dichroic mirror 1050, objective 1060 and sample 1070.

In some implementations, the linear motion stage or slide of the dual optical grating slide SIM imaging system may be mounted with one or more additional lower frequency patterns to aid with alignment of the fringe pattern that is projected on the sample by the imaging gratings (e.g., the two gratings arranged at about ±45° from the axis of motion of linear motion stage). For example, linear motion stage 1030 of FIGS. 10A-10B may be mounted with the additional alignment pattern, or linear motion stage 1330 of FIG. 13 may be mounted with the additional alignment pattern. In instances where the two imaging gratings are embedded in the same substrate as depicted in FIG. 13, the alignment grating may also be embedded in that substrate, or it may be incorporated in a separate substrate. The alignment pattern may be placed between the two imaging gratings or in some other suitable position on the motion stage.

Figure 17:
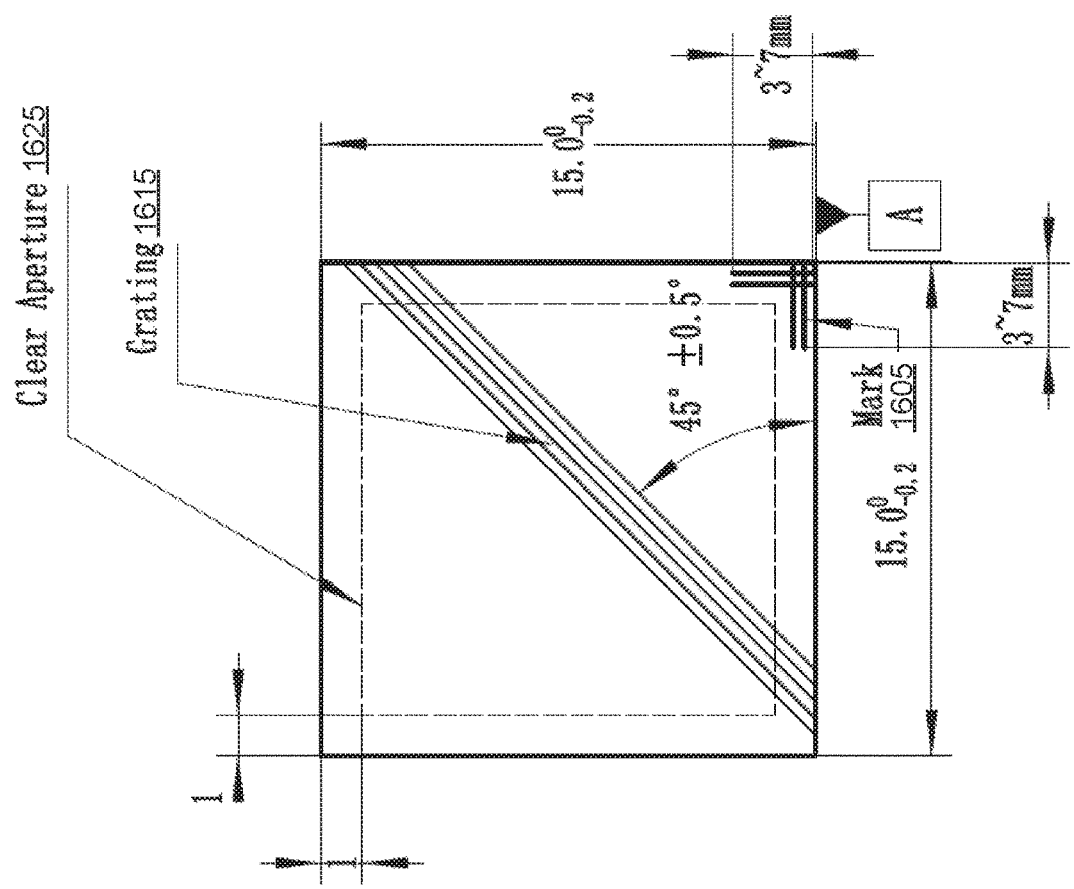
FIG. 17 shows one example of an alignment pattern that may be used in some implementations of a multiple optical grating slide SIM imaging system.

The alignment pattern, when illuminated, may be configured to project a pattern having a lower frequency and/or greater pitch on a sample. By virtue of these characteristics, coarse alignment of the gratings with respect to the sample may be facilitated. The alignment pattern may be implemented as parallel lines, orthogonal lines, and/or a grating having a lower frequency of slits than the other gratings. In some implementations, multiple alignment patterns may be used. FIG. 17 shows one example of an alignment pattern that may be used in implementations of the disclosure. As illustrated in this example, an alignment pattern mark 1605 is implemented on the same substrate as a grating 1615, outside of clear aperture 1625. In this example, the alignment pattern is implemented as two sets of orthogonal lines. By virtue of this implementation, grating tilt may be checked. In some implementations, the illustrated alignment pattern may be implemented in multiple areas (e.g., four corners of a substrate).

During use, the alignment pattern may be illuminated to project a pattern. The alignment pattern may be utilized during SIM imaging system manufacture, after field installation, or during a field service engineer check. In some implementations, the alignment pattern may be utilized during operation of the dual optical grating slide SIM imaging system. For example, the alignment pattern may be illuminated to project an alignment pattern before imaging of a sample begins.

In some implementations of the dual optical grating slide SIM imaging system, an optical phase modulator (e.g., a rotating window) that is a separate component than the linear motion stage may be utilized for phase tuning. In such implementations, the optical phase modulator may be used for phase tuning instead of the linear motion stage (e.g., the linear motion stage may only be used for switching between the two gratings). By virtue of such implementations, the speed, accuracy, and/or reliability of the system may potentially be improved by substantially decreasing the number of translations required over time by the motion stage and by obviating the need to use a motion stage to make fine translations (e.g., on the order of μm) to select a phase.

Figure 19:
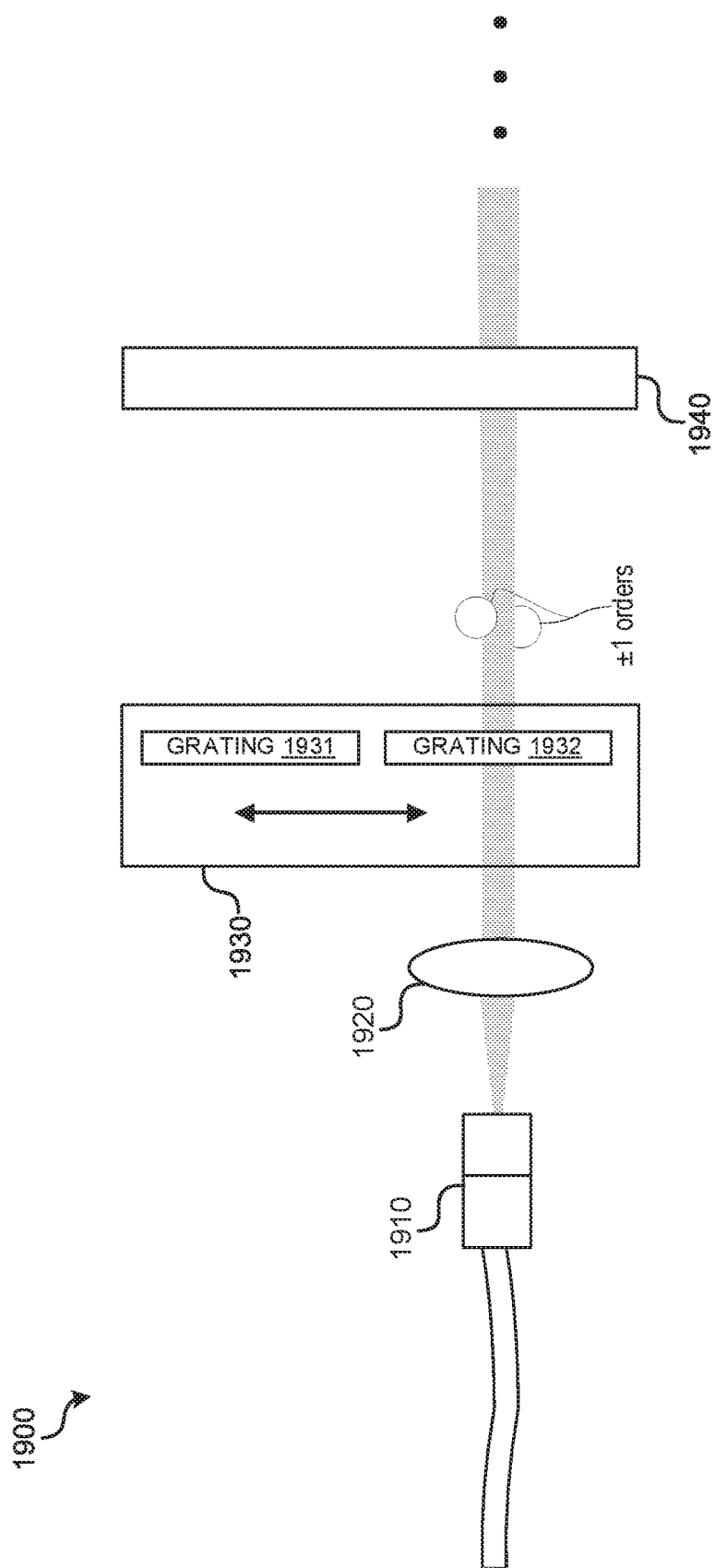
FIG. 19 illustrates some components of an example dual optical grating slide SIM imaging system in accordance with some implementations described herein.

The optical phase modulator may be placed in the light path between the light source and sample, after the gratings (e.g., directly after the motion stage). FIG. 19 illustrates some components of one example dual optical grating slide SIM imaging system 1900 in accordance with such implementations. As shown, system 1900 includes a light emitter 1910 (e.g., optical fiber optically coupled to a light source), a first optical collimator 1920 (e.g., collimation lens) to collimate light output by light emitter 1910, a linear motion stage 1930 mounted with a first diffraction grating 1931 (e.g., horizontal grating) and a second diffraction grating 1932 (e.g. vertical grating), and an optical phase modulator 1940 to phase shift the diffracted light output by each grating.

Pattern Angle Spatial Selection Structured Illumination Microscopy Imaging System In accordance with some implementations of the technology disclosed herein, the SIM imaging system may be implemented as a pattern angle spatial selection SIM imaging system, whereby a fixed two dimensional diffraction grating is used in combination with a spatial filter wheel to project one-dimensional diffraction patterns on the sample.

Figure 14:
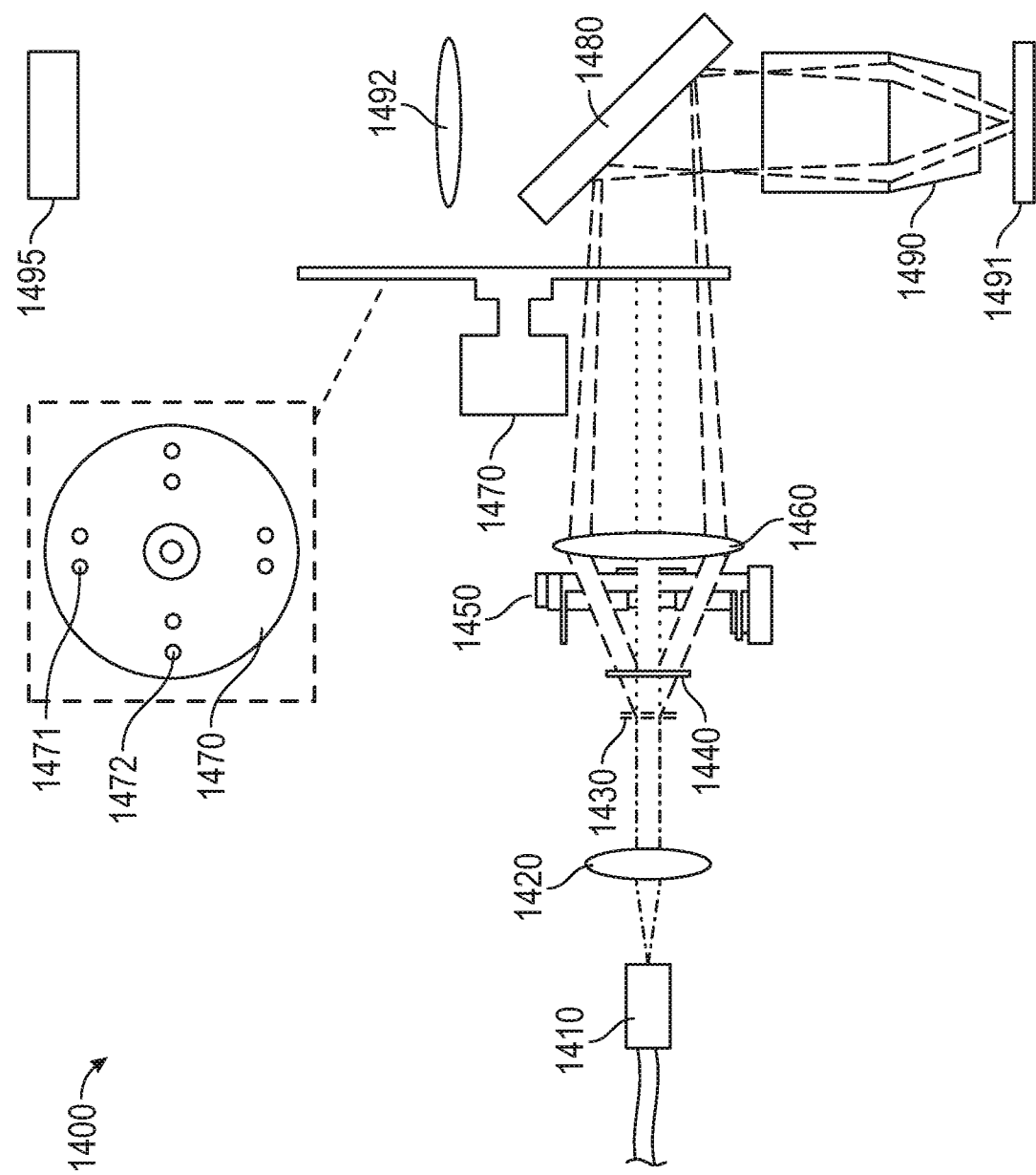
FIG. 14 is a schematic diagram illustrating an example optical configuration of a pattern angle spatial selection SIM imaging system, in accordance with some implementations described herein.

FIG. 14 is a schematic diagram illustrating an example optical configuration of a pattern angle spatial selection SIM imaging system 1400 in accordance with some implementations described herein. For simplicity, optical components of SIM imaging system 1400 may be omitted from FIG. 14. Additionally, although system 1400 is illustrated in this example as a single channel system, in other implementations, it may be implemented as a multi-channel system (e.g., by using two different cameras and light sources that emit in two different wavelengths).

As illustrated, system 1400 includes a light emitter 1410 (e.g., optical fiber), a collimator 1420 to collimate light emitted by emitter 1410, a two-dimensional grating 1430, a zero order beam blocker 1440, an optical phase modulator 1450, a projection lens 1460, a spatial filter wheel 1470, a dichroic mirror 1480, an objective 1490, a sample 1491, and a camera 1495.

In this example configuration, grating 1430 is a two-dimensional transmission diffraction grating configured to diffract an input beam into a number of orders (e.g., 0 order, ±1 orders, ±2 orders, etc.) in two perpendicular directions. To improve the efficiency and performance of the system, the zeroth order beams and all other higher order beams (i.e., ±2 orders or higher) may be blocked (i.e., filtered out of the illumination pattern projected on the sample 1491). While higher orders may be diffracted out at wide angles where they may be filtered using a variety of filtering elements, the 0-order component pass through straight through the grating in the beam path toward the sample. To block the 0-order component, a beam blocking element 1440 may be inserted into the optical path after two-dimensional diffraction grating 1430. For example, beam blocking element 1440 may be a Volume Bragg Grating (VBG), a diffractive optical element that can be patterned to reflect light normal to the element (e.g., 0-order light) and pass through light at other angles, such as the +1 & −1 orders. With the 0-order removed, smaller and more compact optics can be used to focus the +1 & −1 orders down to the objective lens.

Optical phase modulator 1450 (e.g., a rotating window) may be used to change the phase of the incident light to adjust the pattern phase position on the sample 1491. For example, optical phase modulator 1450 may include a variety of moving optical elements, including a parallel plate optic tilted at a variable angle to the optical axis, a wedged optic rotated about the optical axis, a mirror tilted to translate the beam, electro-optical elements, or acousto-optical elements. In one particular implementation, optical phase modulator 1450 may be implemented as a parallel plate optic tilted in two perpendicular directions to adjust the phase of two different grating angle patterns. Alternatively, in some implementations, the pattern phase position may be adjusted by moving the sample (e.g., using a motion stage) while the projected pattern remains stationary, or by moving both the sample and the projected pattern.

In the example of system 1400, a rotatable spatial filter wheel 1470 may include a plurality of holes oriented in two perpendicular directions (e.g., a vertical set of holes 1471 and a horizontal set of holes 1472) for selecting a vertical grating image or a horizontal grating image for projection on the sample 1491. For example, by rotating the spatial filter wheel, the +/−1 orders of one of the grating patterns may pass through one of the set of holes to generate a horizontal or vertical fringed pattern on sample 1491. In implementations, spatial filter wheel 1470 may be implemented as a lightweight mask or spatial filter (e.g., a rotating disk including a plurality of ports or apertures).

In the configuration of system 1400, the primary optical components of system 1400 may remain stationary, which may improve the stability of the optical system (and of the illumination pattern) and minimize the weight, vibration output and cost of the moving elements. As some of the beam intensity (e.g., up to 50%) may need to be filtered out in either orientation of spatial filter wheel 1470, in some implementations the spatial filter may be configured to reflect the unneeded beams (e.g., orders of diffraction grating pattern that is not passed through) into a beam dump for proper heat management.

Figure 15:
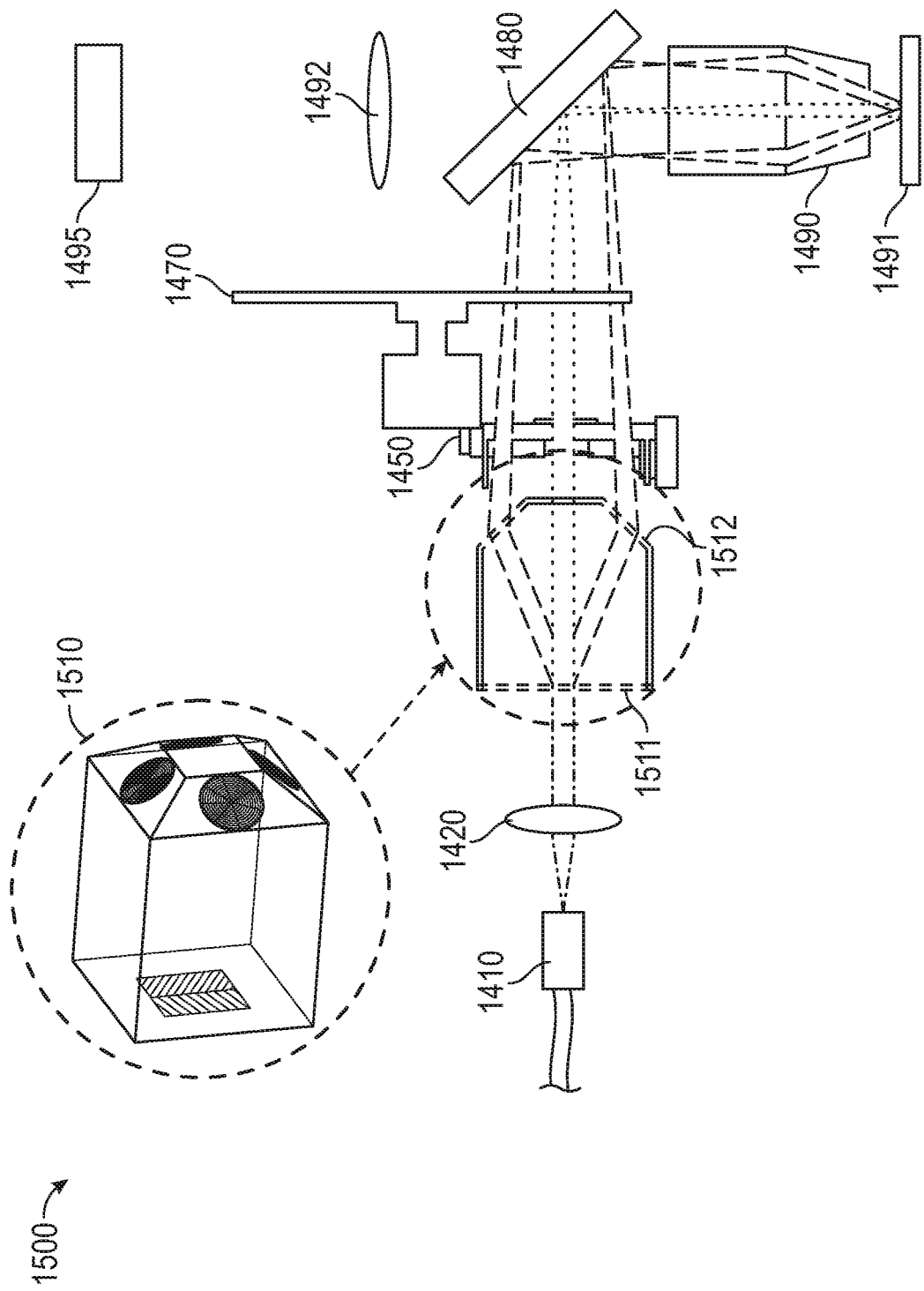
FIG. 15 is a schematic diagram illustrating another example optical configuration of a pattern angle spatial selection SIM imaging system, in accordance with some implementations described herein.

FIG. 15 is a schematic diagram illustrating another example optical configuration of a pattern angle spatial selection SIM imaging system 1500 in accordance with some implementations described herein. In example imaging system 1500, the functions of the two-dimensional transmission grating and beam blocking element may be integrated into a solid optic 1510. Additionally, the function of a projection lens may be integrated into solid optic 1510. In this example implementation, a two-dimensional transmission grating 1511 is fabricated on or otherwise disposed over a face of optic 1510 that receives collimated light from emitter 1410 (the input of optic 1510). The dispersion angles of the grating 1511 may be arranged such that the 0-order light can be blocked on the far side of the optic. The desired +1 & −1 orders, in both directions, may exit from optic 1510 through angled faces 1512 (the output of optic 1510) that diffract the +1 & −1 orders in an optically desirable direction. These output faces may include diffractive focusing lenses. Alternatively, a separate optic may be used as a projection lens to focus the beams onto the objective 1490. In system 1500, a phase shifter 1450 and rotating spatial filter mask 1470 may be used as described above.

Figure 16:
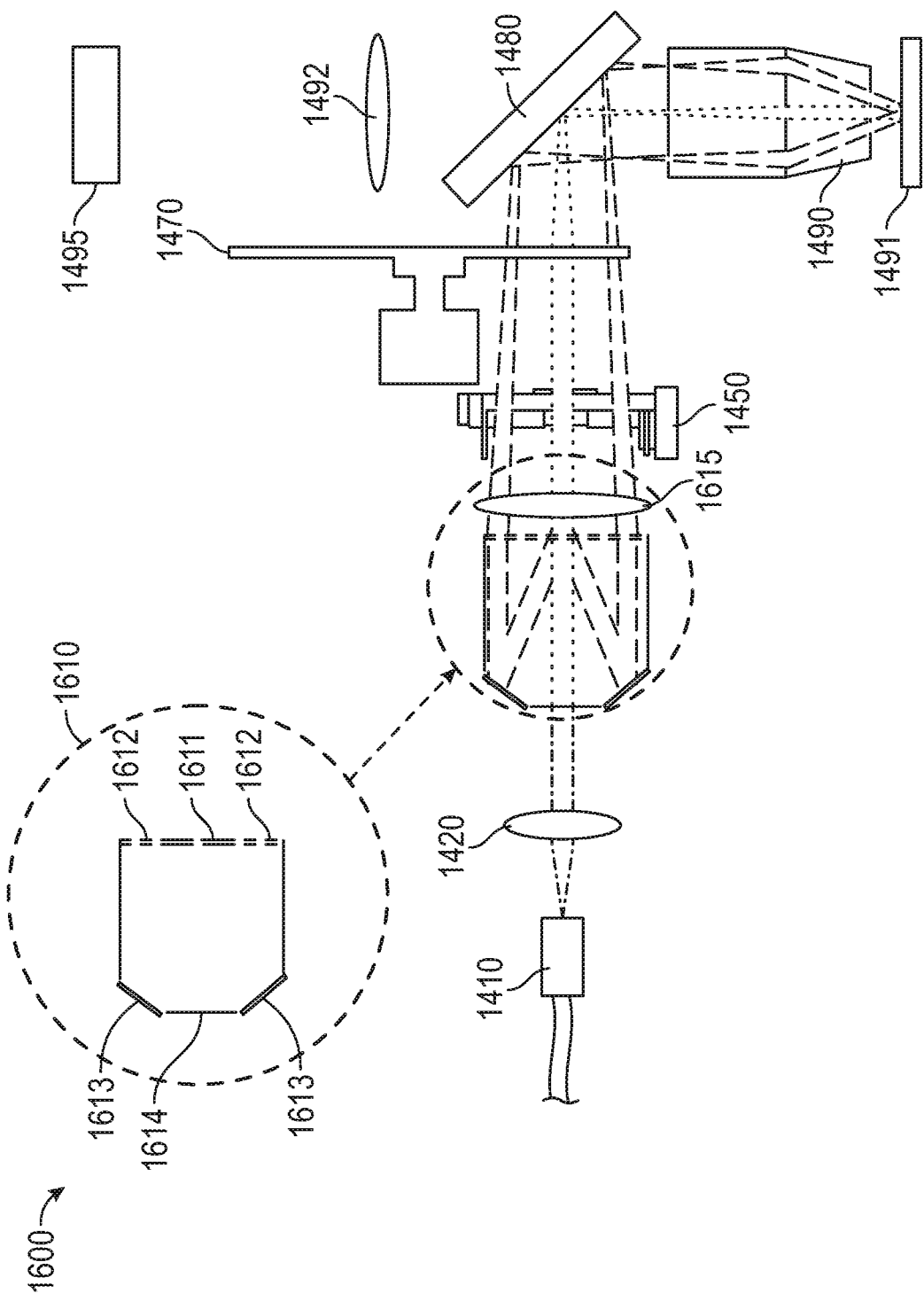
FIG. 16 is a schematic diagram illustrating another example optical configuration of a pattern angle spatial selection SIM imaging system, in accordance with some implementations described herein.

FIG. 16 is a schematic diagram illustrating another example optical configuration of a pattern angle spatial selection SIM imaging system 1600 in accordance with some implementations described herein. In example imaging system 1600, a solid optic 1610 again may be used to integrate the functions of a two-dimensional grating and a beam blocking element. Additionally it may integrate the function of a projection lens. In contrast to example imaging system 1600, the input of solid optic 1610 is an inlet window or aperture 1614 that guides received light to a two-dimensional reflective grating 1611. As grating 1611 is reflective in this example, the 0-order light may be reflected back out through inlet window 1614. The desired +1 & −1 orders of diffracted light, in each of the perpendicular directions, may reflect off of respective reflectively-coated internal faces 1613 of the optic 1610, and exit through outlet faces 1612. In implementations, these outlet faces may include diffractive focusing lenses. Alternatively, a separate projection lens optic 1615 may be used to focus the beams onto the objective 1490. In system 1600, a phase shifter 1450 and rotating spatial filter mask 1470 may be used as described above.

Figure 18:
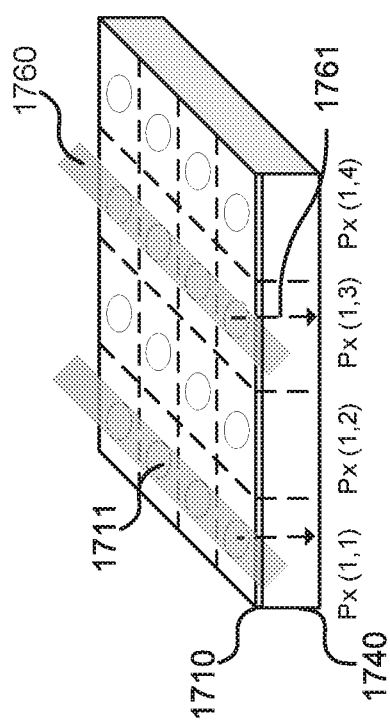
FIG. 18 illustrates a sample that may be formed over an image sensor assembly of a SIM imaging system, in accordance with some implementations described herein.

Although some implementations of the disclosure have been illustrated in the figures in the context of SIM imaging systems that use one or more optics to reimage collected excitation light (e.g., light recollected by the objective) onto an image sensor (e.g., a CCD camera sensor), it should be appreciated that the various implementations described herein may apply to SIM imaging systems that utilize an image sensor (e.g., a CMOS sensor) that is in an active plane of an imaged sample. By way of illustrative example, FIG. 18, illustrates a sample 1710 that may be formed over an image sensor assembly 1740 of a SIM imaging system, in accordance with some implementations described herein. For example, features of the sample may be photolithographically aligned with pixels of the image sensor. Any light emitted by patterned sample 1710 in response to structured illumination is collected by image sensor assembly 1740, which is positioned directly below sample 1710 in this example. Forming sample 1710 over image sensor assembly 1740 may provide the advantage of ensuring that patterned features 1711 of the sample 1710 remain aligned relative to particular photosites (e.g., pixels) of image sensor assembly 1740 during imaging.

Sample 1710 may be patterned and aligned with image sensor assembly 1740 such that each light sensor (e.g., pixel) of image sensor 1740 has one or more features 1711 formed and/or mounted above it. As illustrated in the example of FIG. 18, sample 1710 is patterned over image sensor assembly 1740 such that one feature 1711 is formed over each pixel of the pixel array of image sensor assembly 1740. In other implementations, more than one feature may be formed over each pixel.

In the case of a fluorescent sample, for instance, illuminated features 1711 of the sample may fluoresce in response to the structured excitation light 1760, and the resultant light 1761 emitted by features 1711 may be collected by photosites (e.g., pixels) of image sensor assembly 1740 to detect fluorescence. For example, as illustrated by FIG. 18, pixels (1,1) and (1,3) of image sensor assembly 1740 may collect light 1761 that is emitted by the feature 1711 of the sample that is positioned or patterned over it. In some implementations, a layer (not shown) may provide isolation between sample 1710 and image sensor assembly 1740 (e.g., to shield the image sensor assembly from a fluidic environment of the sample). In other implementations, sample 1710 may be mounted and aligned over image sensor assembly 1740.

It should be noted that although FIG. 18 illustrates an example representation of a SIM imaging system where the SIM fringes line up with the features of the sample in the correct orientation, in practice this is not necessarily or typically the case for SIM imaging. For example, over time and/or space, there may be drift in the spacing between adjacent fringes, the phase or angle of the structured illumination pattern, and/or the orientation of the fringe pattern relative to the illuminated sample. Owing to these variations in SIM parameters, in some instances some illuminated features may be 80% "on" while other features may be 60% "on" and yet other features may be 20% "on." As such, it should be appreciated that in such systems, SIM imaging algorithms may be utilized to take into account these process variations during image reconstruction. For example, variations in structured illumination parameters may be estimated and/or predicted over time to account for these variations.

As used herein, the term module might describe a given unit of functionality that can be performed in accordance with one or more implementations of the present application. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

In this document, the terms "computer readable medium", "computer usable medium" and "computer program medium" are used to generally refer to non-transitory media, volatile or non-volatile, such as, for example, a memory, storage unit, and media. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings).

Although described above in terms of various example implementations and implementations, it should be understood that the various features, aspects and functionality described in one or more of the individual implementations are not limited in their applicability to the particular implementation with which they are described, but instead can be applied, alone or in various combinations, to one or more of the other implementations of the application, whether or not such implementations are described and whether or not such features are presented as being a part of a described implementation. Thus, the breadth and scope of the present application should not be limited by any of the above-described example implementations.

It should be appreciated that all combinations of the foregoing concepts (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

The terms "substantially" and "about" used throughout this disclosure, including the claims, are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

To the extent applicable, the terms "first," "second," "third," etc. herein are merely employed to show the respective objects described by these terms as separate entities and are not meant to connote a sense of chronological order, unless stated explicitly otherwise herein.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide some instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various implementations set forth herein are described in terms of example block diagrams, flow charts and other illustrations. As will become apparent to one of ordinary skill in the art after reading this document, the illustrated implementations and their various alternatives can be implemented without confinement to the illustrated examples. For example, block diagrams and their accompanying description should not be construed as mandating a particular architecture or configuration.

While various implementations of the present disclosure have been described above, it should be understood that they have been presented by way of example only, and not of limitation. Likewise, the various diagrams may depict an example architectural or other configuration for the disclosure, which is done to aid in understanding the features and functionality that can be included in the disclosure. The disclosure is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present disclosure. Also, a multitude of different constituent module names other than those depicted herein can be applied to the various partitions. Additionally, with regard to flow diagrams, operational descriptions and method claims, the order in which the steps are presented herein shall not mandate that various implementations be implemented to perform the recited functionality in the same order unless the context dictates otherwise.

What is claimed is:

1. A structured illumination imaging system, comprising:
    a light emitter to emit light;
    a two-dimensional diffraction grating to diffract light emitted by the light emitter to project a first plurality of fringes oriented in a first direction on a sample plane and to project a second plurality of fringes oriented in a second direction, perpendicular to the first direction, on the sample plane; and
    a spatial filter wheel to pass through diffracted light received from the two-dimensional diffraction grating in a respective one of the first or second directions and block light in a respective one of the first or second directions, the spatial filter wheel comprising a first plurality of apertures to pass through light diffracted by the two-dimensional diffraction grating in the first direction and a second plurality of apertures orthogonal to the first plurality of apertures to pass through light diffracted by the two-dimensional diffraction grating in the second direction.

2. The structured illumination imaging system of claim 1, further comprising: a beam blocking element to block 0th order light transmitted by the two-dimensional diffraction grating.

3. The structure illumination imaging system of claim 2, wherein the beam blocking element comprises a diffractive optical element patterned to reflect light normal to the element and pass through light at other angles.

4. The structured illumination imaging system of claim 1, wherein the spatial filter wheel is to reflect diffraction orders of light received from the two-dimensional diffraction grating that are not passed through.

5. The structured illumination imaging system of claim 1, wherein the two-dimensional diffraction grating is a transmissive diffraction grating.

6. The structured illumination imaging system of claim 5, further comprising: a solid optic, wherein the transmissive diffraction grating is disposed over or formed on a face of the solid optic that receives light from the light emitter.

7. The structured illumination imaging system of claim 6, wherein dispersion angles of the transmissive diffraction grating are arranged such that 0th order light is blocked on a far side of the solid optic.

8. The structured illumination imaging system of claim 7, wherein the solid optic comprises angled faces to diffract and output first orders of light diffracted by the two-dimensional transmissive diffraction grating.

9. The structured illumination imaging system of claim 8, wherein the angled faces comprise a focusing lens.

10. The structured illumination imaging system of claim 8, further comprising: a projection lens to receive light output by the solid optic.

11. The structured illumination imaging system of claim 1, wherein the two-dimensional diffraction grating is a two-dimensional reflective diffraction grating.

12. The structured illumination imaging system of claim 11, further comprising: a solid optic, wherein the two-dimensional reflective diffraction grating is formed on or disposed over a face of the solid optic opposite an aperture of the solid optic that receives light from the light emitter.

13. The structured illumination imaging system of claim 12, wherein the solid optic further comprises reflective internal faces to reflect and output first orders of light diffracted by the two-dimensional reflective diffraction grating through outlet faces of the solid optic.

14. The structured illumination imaging system of claim 13, wherein the outlet faces comprise a diffractive focusing lens.

15. The structure illumination imaging system of claim 13, further comprising: a projection lens to receive light output by the solid optic.

16. The structured illumination imaging system of claim 1, further comprising: one or more optical elements to phase shift the first plurality of fringes and the second plurality of fringes, wherein the one or more optical elements to phase shift the first plurality of fringes and the second plurality of fringes comprise a parallel plate optic tilted in two perpendicular directions.

17. A method for using a structured illumination imaging system, comprising:
    turning on a light emitter of a structured illumination imaging system, the structured illumination imaging system comprising a two-dimensional diffraction grating;
    receiving light emitted by the light emitter at the two-dimensional diffraction grating to output first diffracted light oriented in a first direction and second diffracted light oriented in a second direction perpendicular to the first direction;
    passing the first diffracted light through a first plurality of apertures of a spatial filter wheel and blocking the second diffracted light at the spatial filter wheel;
    projecting the first diffracted light passed through the first plurality of holes as a first plurality of fringes on a sample plane; and
    capturing a first plurality of phase images of light emitted by the sample, wherein during capture of the first plurality of images, the first plurality of fringes are phase shifted on the sample plane.

18. The method of claim 17, further comprising:
    rotating the spatial filter wheel such that it passes the second diffracted light through a second plurality of apertures of the spatial filter wheel and blocks the first diffracted light at the spatial filter wheel;
    projecting the second diffracted light that passes through the second plurality of holes as a second plurality of fringes, orthogonal to the first plurality of fringes, on the sample plane; and capturing a second plurality of phase images of light emitted by the sample, wherein during capture of the second plurality of images, the second plurality of fringes are phase shifted on the sample plane.

19. The method of claim 17, wherein the two-dimensional diffraction grating is a two-dimensional transmissive diffraction grating formed on a face of a solid optic, wherein the method further comprises:
    blocking 0th order light output by the transmissive diffraction grating at a side of the solid optic opposite the transmissive diffraction grating; and
    diffracting and outputting, from angled faces of the solid optic, first orders of light diffracted by the two-dimensional transmissive diffraction grating.

20. The method of claim 17, wherein the two-dimensional diffraction grating is a two-dimensional reflective diffraction grating formed on a face of a solid optic opposite an aperture of the solid optic that receives light from the light emitter, wherein the method further comprises: reflecting, at faces of the solid optic, first orders of light diffracted by the two-dimensional reflective diffraction grating.

\* \* \* \* \*

UNITED STATES PATENT AND TRADEMARK OFFICE
CERTIFICATE OF CORRECTION

PATENT NO. : 10,996,453 B2  
APPLICATION NO. : 16/626113  
DATED : May 4, 2021  
INVENTOR(S) : Peter Newman et al.

Page 1 of 1

It is certified that error appears in the above-identified patent and that said Letters Patent is hereby corrected as shown below:

In the Claims

Column (29), under Line 37, In Claim 3, delete "structure" and insert -- structured --.

Column (30), under Line 14, In Claim 15, delete "structure" and insert -- structured --.

Signed and Sealed this  
Twenty-fourth Day of August, 2021

Drew Hirshfeld  
*Performing the Functions and Duties of the*  
*Under Secretary of Commerce for Intellectual Property and*  
*Director of the United States Patent and Trademark Office*